US012687919B2

(12) United States Patent
Lv

(10) Patent No.: US 12,687,919 B2
(45) Date of Patent: Jul. 21, 2026

(54) METHOD AND APPARATUS FOR DISPLAYING IMAGE ON HEAD-MOUNTED DISPLAY DEVICE, AND ELECTRONIC DEVICE

(71) Applicant: MATRIXED REALITY TECHNOLOGY CO., LTD., Wuxi (CN)

(72) Inventor: Xianwei Lv, Beijing (CN)

(73) Assignee: MATRIXED REALITY TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/863,341

(22) PCT Filed: May 10, 2023

(86) PCT No.: PCT/CN2023/093339
§ 371 (c)(1),
(2) Date: Nov. 6, 2024

(87) PCT Pub. No.: WO2023/217198
PCT Pub. Date: Nov. 16, 2023

(65) Prior Publication Data
US 2025/0315101 A1     Oct. 9, 2025

(30) Foreign Application Priority Data

May 11, 2022   (CN) .......................... 202210510750.8

(51) Int. Cl.
*G06F 3/01*         (2006.01)
*G06F 3/0346*      (2013.01)
*G06T 15/20*       (2011.01)
(52) U.S. Cl.
CPC ............ *G06F 3/012* (2013.01); *G06F 3/0346* (2013.01); *G06T 15/205* (2013.01)

(58) Field of Classification Search
CPC ...... G06F 3/012; G06F 3/0346; G06T 15/205
See application file for complete search history.

(56) References Cited

U.S. PATENT DOCUMENTS

2017/0100664 A1     4/2017   Osterhout et al.
2018/0224273 A1*   8/2018   Yamada ............... A61B 5/6802
(Continued)

FOREIGN PATENT DOCUMENTS

CN          106998409 A      8/2017
CN          107204044 A      9/2017
(Continued)

OTHER PUBLICATIONS

ISR received in PCT/CN2023/093339; mailed Jul. 22, 2023.
(Continued)

*Primary Examiner* — Ryan A Lubit
(74) *Attorney, Agent, or Firm* — K&L Gates LLP

(57)          ABSTRACT

The present application discloses a method and apparatus for displaying an image on a head-mounted display device, and an electronic device. A specific implementation solution is as follows: determining a reference pose for processing a to-be-display image at a current time, based on angular velocity data of the head-mounted display device at the current time, and a first corrected pose for processing a display image of the head-mounted display device at a previous time; processing a pose error between the reference pose and a preset pose for processing a display image to obtain a corrected pose difference; compensating the reference pose by using the corrected pose difference to obtain a second corrected pose for processing the to-be-display image at the current time; and rendering the to-be-display image of the head-mounted display device based on the second corrected pose to display the to-be-display image of the head-mounted display device.

19 Claims, 16 Drawing Sheets

(56) References Cited

U.S. PATENT DOCUMENTS

| | | | | |
|---|---|---|---|---|
| 2018/0253142 | A1* | 9/2018 | Tsuchie | G06F 3/011 |
| 2019/0302883 | A1* | 10/2019 | Greer | G06T 1/20 |
| 2020/0098302 | A1* | 3/2020 | Jia | G09G 3/2007 |
| 2021/0124413 | A1* | 4/2021 | Burgers | G06F 3/0346 |
| 2022/0294937 | A1* | 9/2022 | Furukawa | H04N 23/6811 |

FOREIGN PATENT DOCUMENTS

| | | | |
|---|---|---|---|
| CN | 107560637 | A | 1/2018 |
| CN | 107801014 | A | 3/2018 |
| CN | 110850961 | A | 2/2020 |
| CN | 112015269 | A | 12/2020 |
| CN | 112308981 | A | 2/2021 |
| CN | 113383296 | A | 9/2021 |
| CN | 113888685 | A | 1/2022 |
| CN | 114286762 | A | 4/2022 |
| CN | 114979615 | A | 8/2022 |
| EP | 3054266 | A1 | 8/2016 |
| JP | H0678248 | A | 3/1994 |
| JP | 2002296028 | A | 10/2002 |
| JP | 2003132374 | A | 5/2003 |
| JP | 2004219664 | A | 8/2004 |
| JP | 2011257342 | A | 12/2011 |
| JP | 2019113849 | A | 7/2019 |
| JP | 2019184883 | A | 10/2019 |
| JP | 2019220059 | A | 12/2019 |
| JP | 2021051512 | A | 4/2021 |
| WO | 2015098211 | A1 | 7/2015 |
| WO | 2017156741 | A1 | 9/2017 |
| WO | 2020170455 | A1 | 8/2020 |
| WO | 2023107806 | A1 | 6/2023 |

OTHER PUBLICATIONS

First OA received in CN Application No. 202210510750.8; mailed Apr. 28, 2023.

Third OA received in CN Application No. 202210510750.8; mailed May 20, 2024.

The extended European search report received in the counterpart EP application 23802967.2, dated Jul. 14, 2025, 11 pages.

The Notice of Preliminary Rejection received in the counterpart Korean application 10-2024-7037388, dated Jan. 21, 2026, 10 pages.

The Notice of Rejection received in the counterpart JP Application No. 2024-566664, dated May 12, 2026, 6 pages with English translation.

* cited by examiner

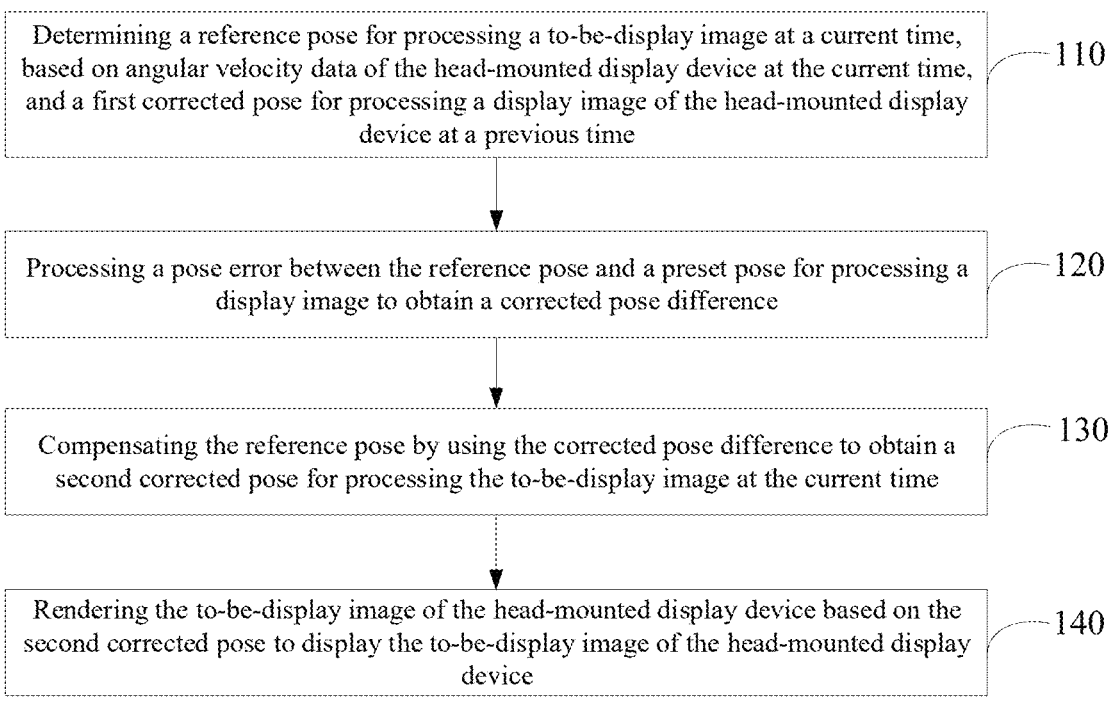

Determining a reference pose for processing a to-be-display image at a current time, based on angular velocity data of the head-mounted display device at the current time, and a first corrected pose for processing a display image of the head-mounted display device at a previous time ⌐110

Processing a pose error between the reference pose and a preset pose for processing a display image to obtain a corrected pose difference ⌐120

Compensating the reference pose by using the corrected pose difference to obtain a second corrected pose for processing the to-be-display image at the current time ⌐130

Rendering the to-be-display image of the head-mounted display device based on the second corrected pose to display the to-be-display image of the head-mounted display device ⌐140

Fig. 1

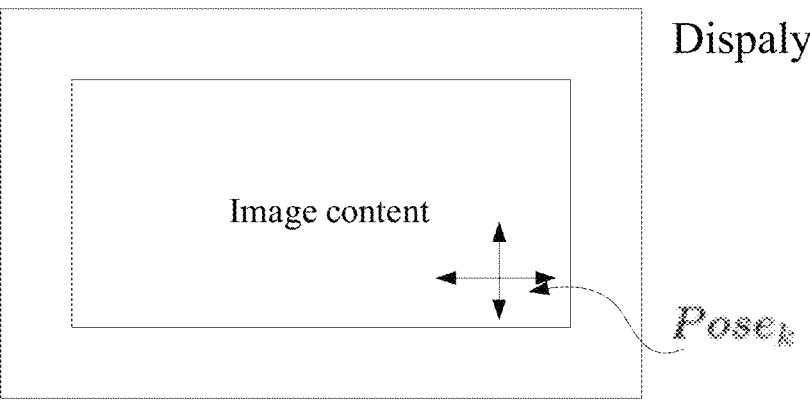

Fig. 2

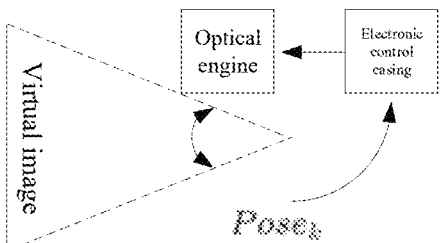

Fig. 3

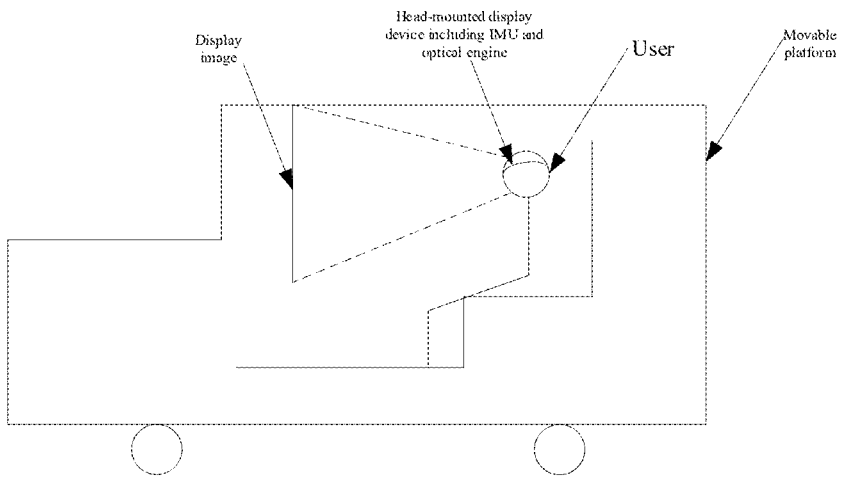

Fig. 4

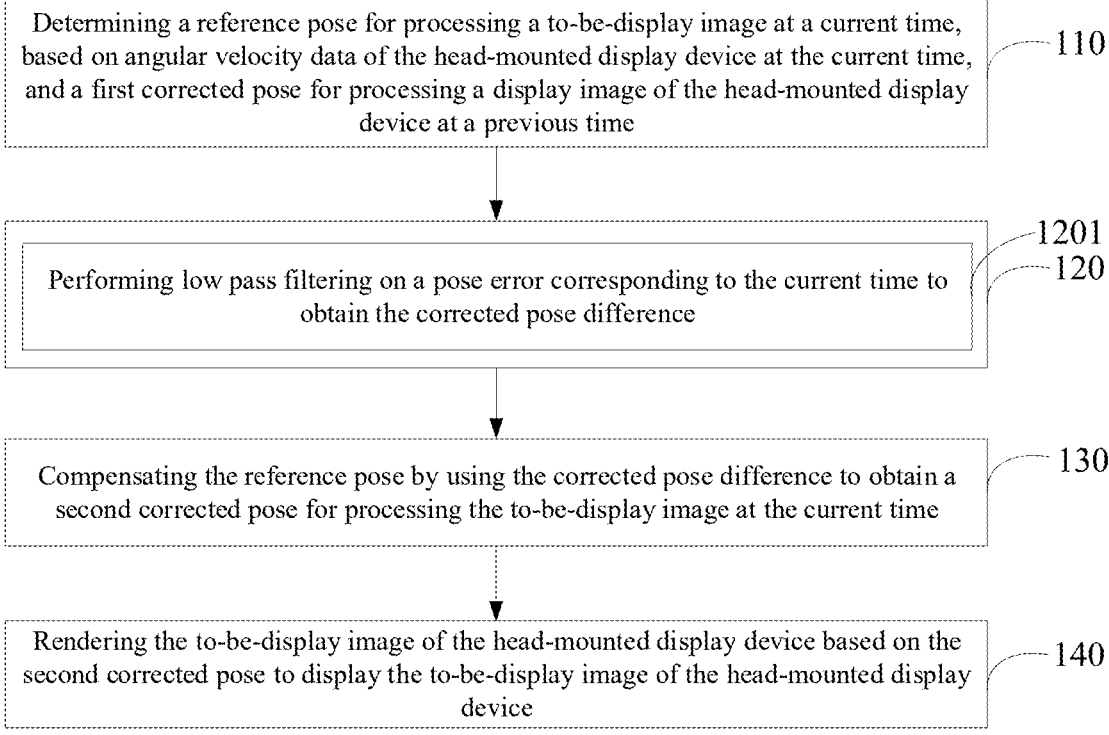

Determining a reference pose for processing a to-be-display image at a current time, based on angular velocity data of the head-mounted display device at the current time, and a first corrected pose for processing a display image of the head-mounted display device at a previous time — 110

Performing low pass filtering on a pose error corresponding to the current time to obtain the corrected pose difference — 1201 / 120

Compensating the reference pose by using the corrected pose difference to obtain a second corrected pose for processing the to-be-display image at the current time — 130

Rendering the to-be-display image of the head-mounted display device based on the second corrected pose to display the to-be-display image of the head-mounted display device — 140

Fig. 5

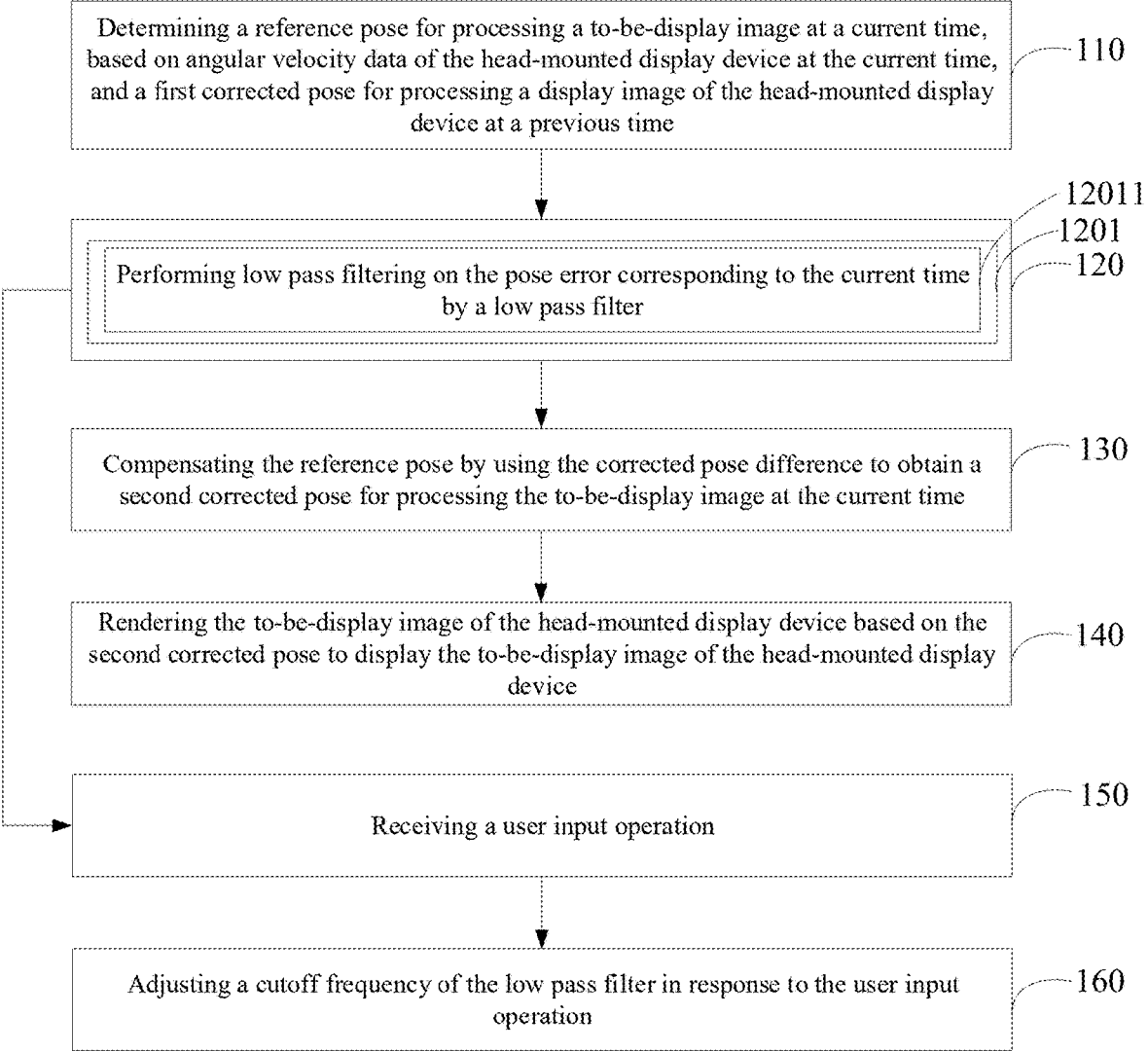

Determining a reference pose for processing a to-be-display image at a current time, based on angular velocity data of the head-mounted display device at the current time, and a first corrected pose for processing a display image of the head-mounted display device at a previous time — 110

Performing low pass filtering on the pose error corresponding to the current time by a low pass filter — 12011 — 1201 — 120

Compensating the reference pose by using the corrected pose difference to obtain a second corrected pose for processing the to-be-display image at the current time — 130

Rendering the to-be-display image of the head-mounted display device based on the second corrected pose to display the to-be-display image of the head-mounted display device — 140

Receiving a user input operation — 150

Adjusting a cutoff frequency of the low pass filter in response to the user input operation — 160

Fig. 7

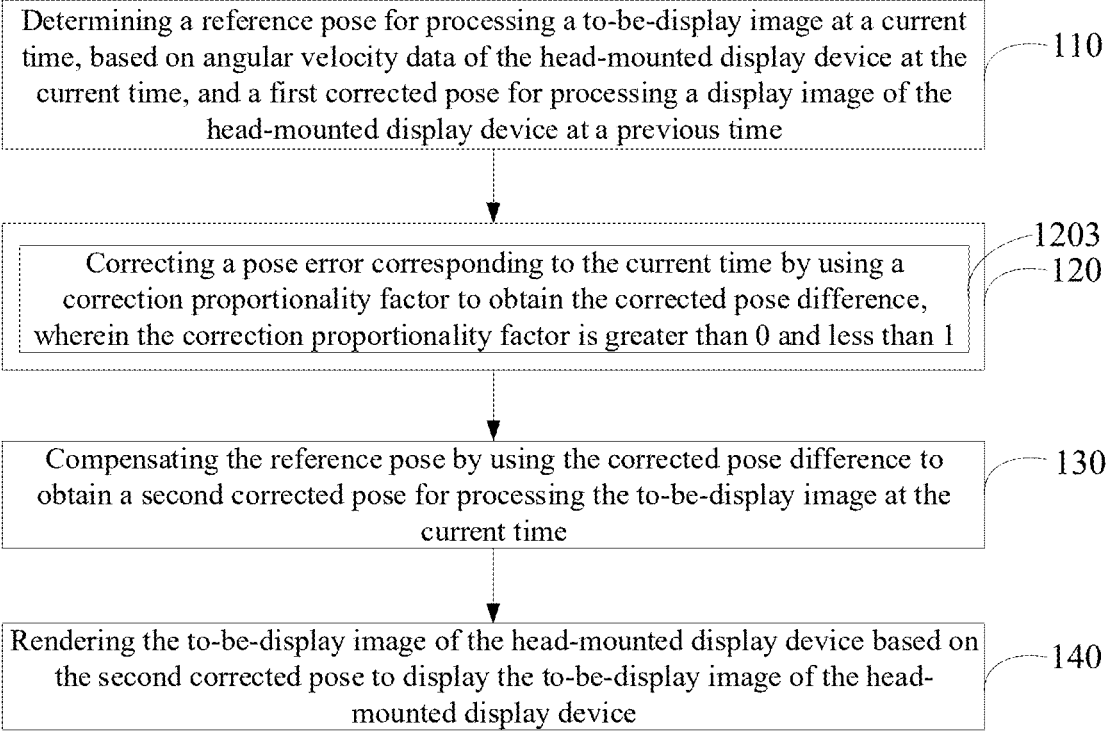

Determining a reference pose for processing a to-be-display image at a current time, based on angular velocity data of the head-mounted display device at the current time, and a first corrected pose for processing a display image of the head-mounted display device at a previous time ⌐110

Correcting a pose error corresponding to the current time by using a correction proportionality factor to obtain the corrected pose difference, wherein the correction proportionality factor is greater than 0 and less than 1 ⌐1203 ⌐120

Compensating the reference pose by using the corrected pose difference to obtain a second corrected pose for processing the to-be-display image at the current time ⌐130

Rendering the to-be-display image of the head-mounted display device based on the second corrected pose to display the to-be-display image of the head-mounted display device ⌐140

Fig. 8

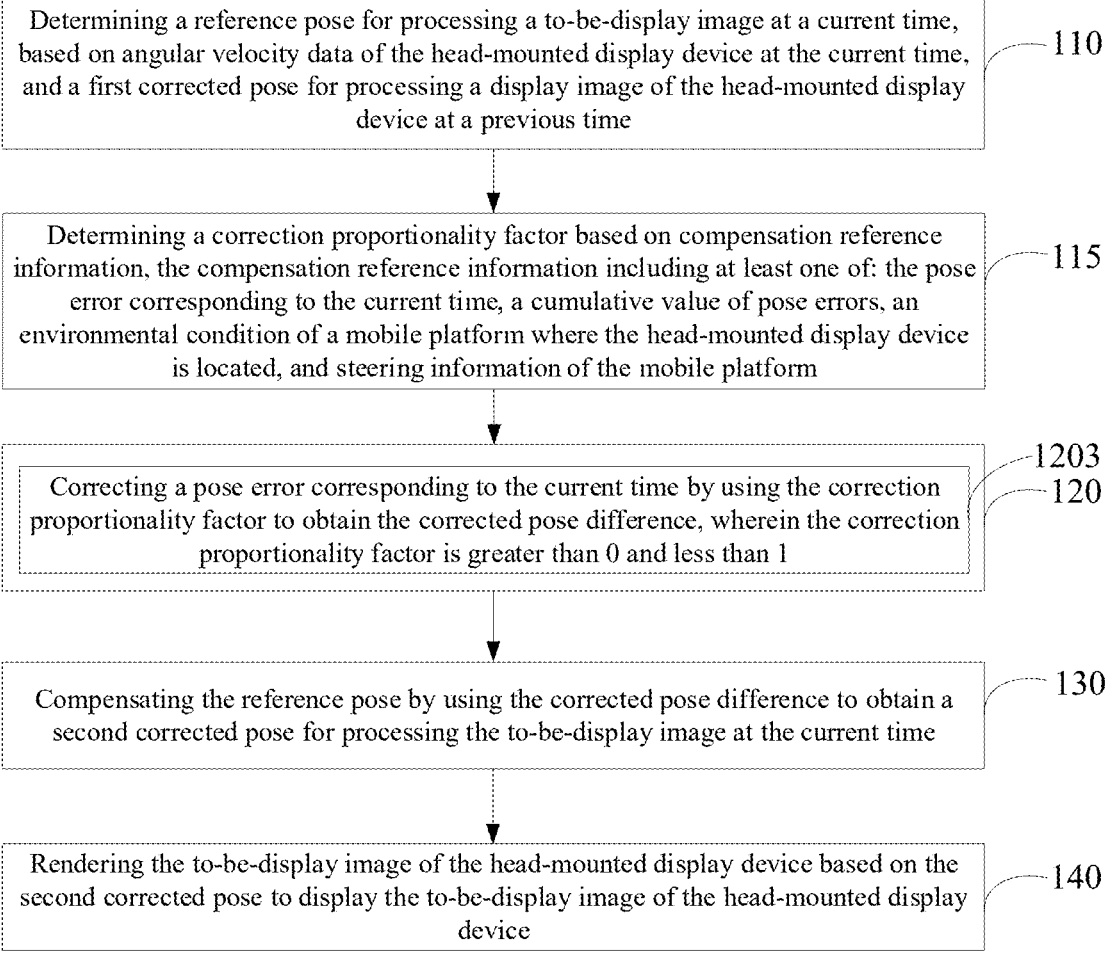

Determining a reference pose for processing a to-be-display image at a current time, based on angular velocity data of the head-mounted display device at the current time, and a first corrected pose for processing a display image of the head-mounted display device at a previous time                                     110

Determining a correction proportionality factor based on compensation reference information, the compensation reference information including at least one of: the pose error corresponding to the current time, a cumulative value of pose errors, an environmental condition of a mobile platform where the head-mounted display device is located, and steering information of the mobile platform                              115

Correcting a pose error corresponding to the current time by using the correction proportionality factor to obtain the corrected pose difference, wherein the correction proportionality factor is greater than 0 and less than 1                     1203  120

Compensating the reference pose by using the corrected pose difference to obtain a second corrected pose for processing the to-be-display image at the current time          130

Rendering the to-be-display image of the head-mounted display device based on the second corrected pose to display the to-be-display image of the head-mounted display device          140

Fig. 9

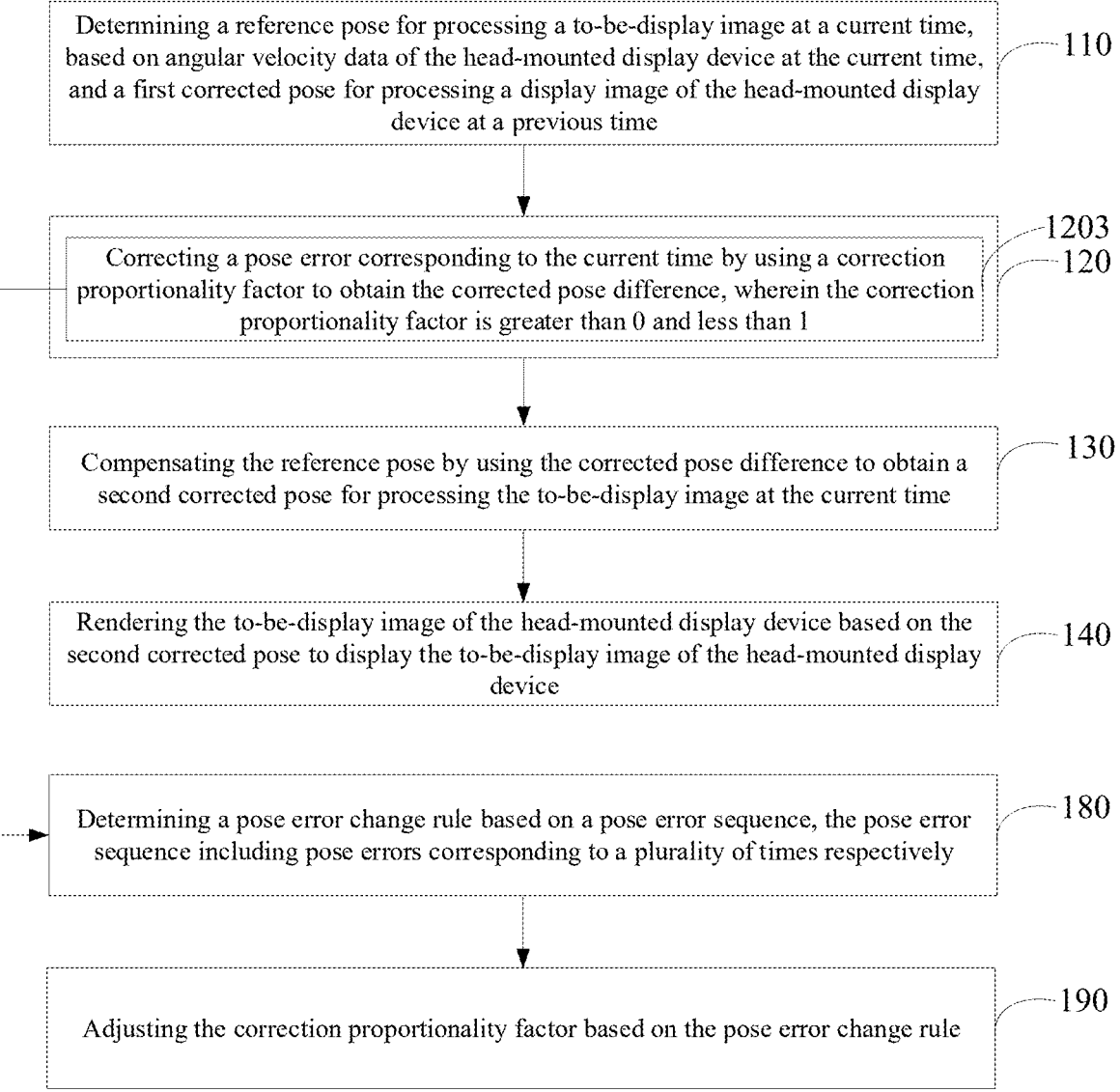

Determining a reference pose for processing a to-be-display image at a current time, based on angular velocity data of the head-mounted display device at the current time, and a first corrected pose for processing a display image of the head-mounted display device at a previous time — 110

Correcting a pose error corresponding to the current time by using a correction proportionality factor to obtain the corrected pose difference, wherein the correction proportionality factor is greater than 0 and less than 1 — 1203 / 120

Compensating the reference pose by using the corrected pose difference to obtain a second corrected pose for processing the to-be-display image at the current time — 130

Rendering the to-be-display image of the head-mounted display device based on the second corrected pose to display the to-be-display image of the head-mounted display device — 140

Determining a pose error change rule based on a pose error sequence, the pose error sequence including pose errors corresponding to a plurality of times respectively — 180

Adjusting the correction proportionality factor based on the pose error change rule — 190

Fig. 10

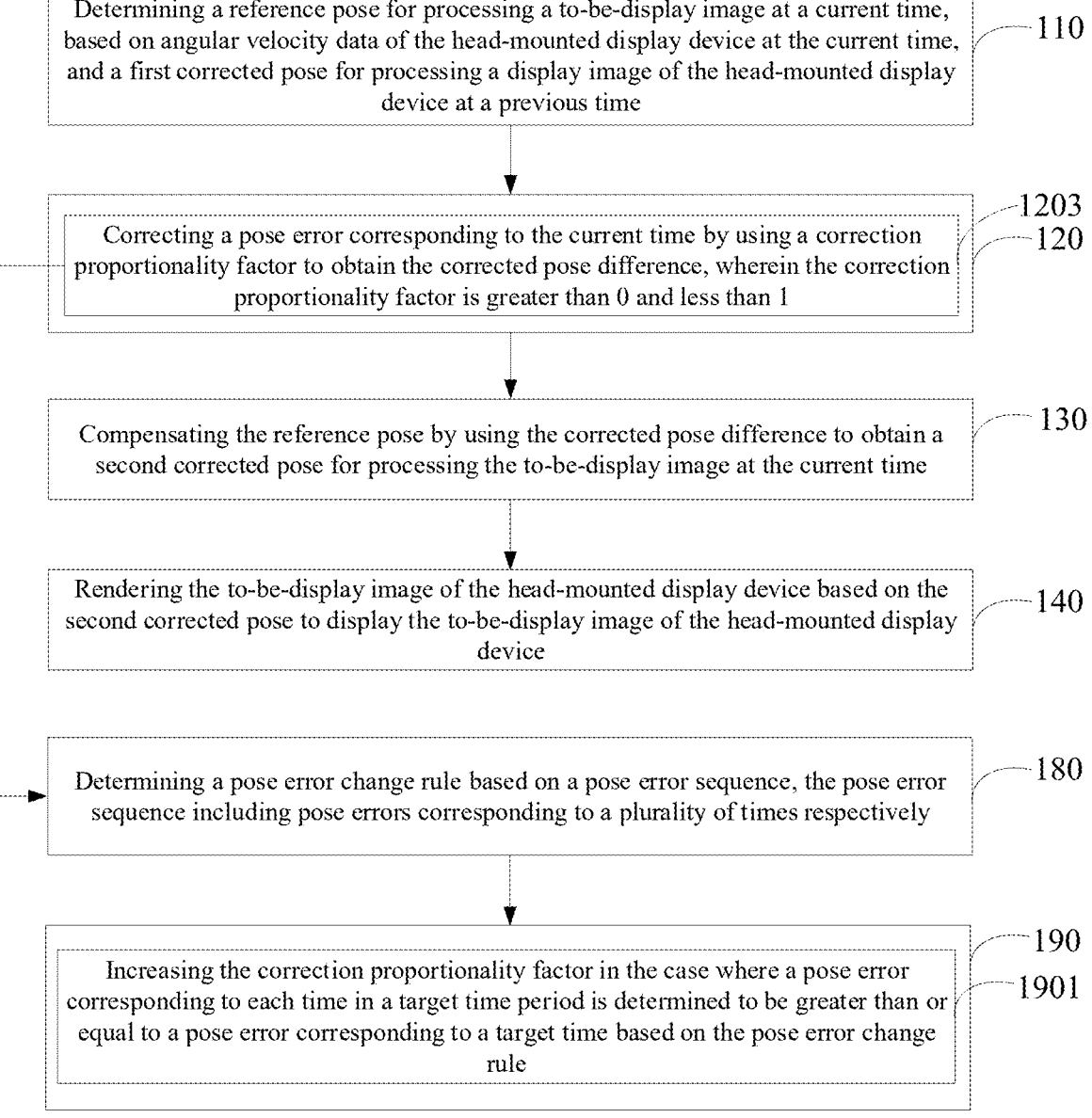

Determining a reference pose for processing a to-be-display image at a current time, based on angular velocity data of the head-mounted display device at the current time, and a first corrected pose for processing a display image of the head-mounted display device at a previous time ~110

Correcting a pose error corresponding to the current time by using a correction proportionality factor to obtain the corrected pose difference, wherein the correction proportionality factor is greater than 0 and less than 1 ~1203 ~120

Compensating the reference pose by using the corrected pose difference to obtain a second corrected pose for processing the to-be-display image at the current time ~130

Rendering the to-be-display image of the head-mounted display device based on the second corrected pose to display the to-be-display image of the head-mounted display device ~140

Determining a pose error change rule based on a pose error sequence, the pose error sequence including pose errors corresponding to a plurality of times respectively ~180

Increasing the correction proportionality factor in the case where a pose error corresponding to each time in a target time period is determined to be greater than or equal to a pose error corresponding to a target time based on the pose error change rule ~190 ~1901

Fig. 11-1

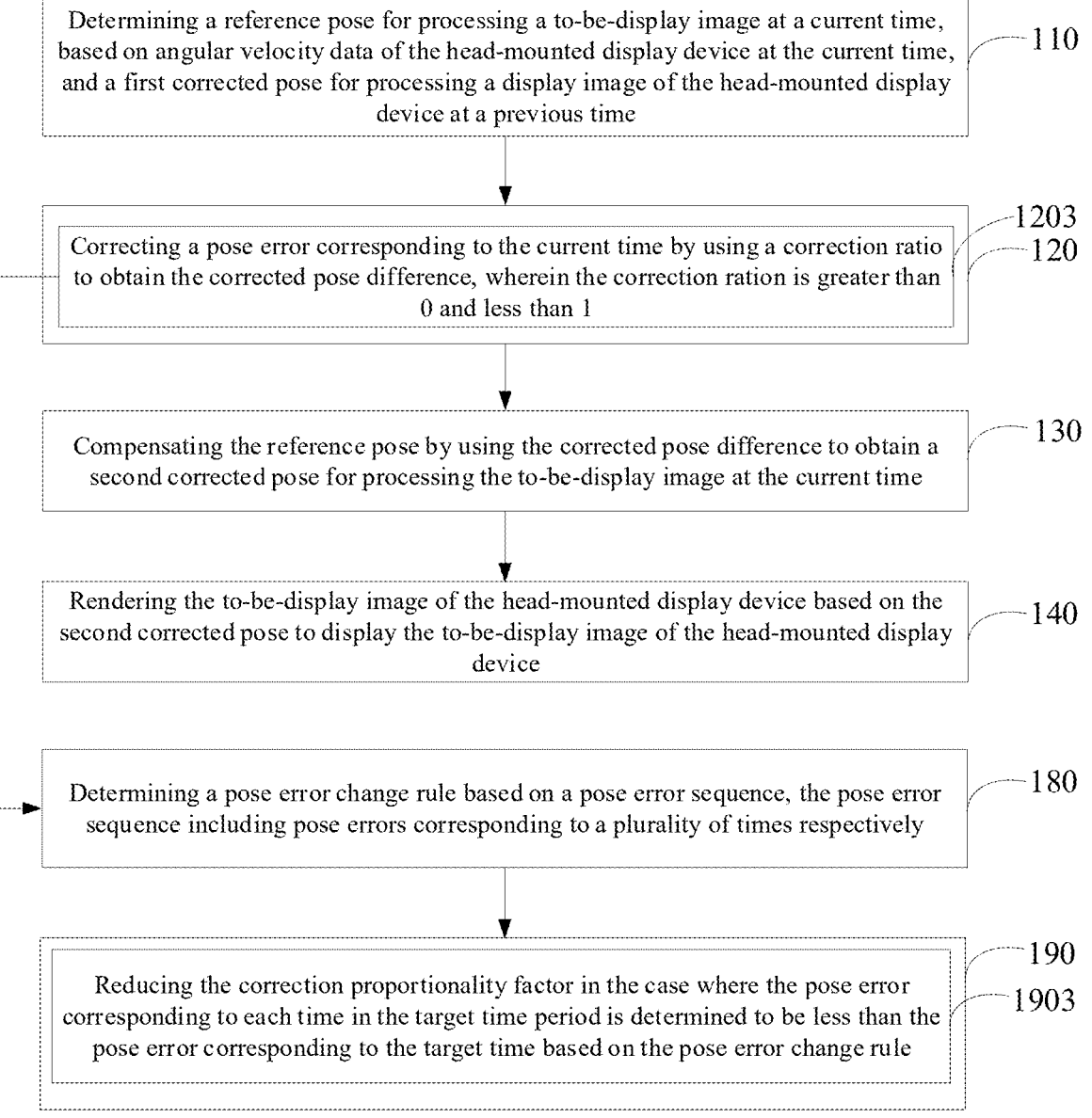

Determining a reference pose for processing a to-be-display image at a current time, based on angular velocity data of the head-mounted display device at the current time, and a first corrected pose for processing a display image of the head-mounted display device at a previous time          110

Correcting a pose error corresponding to the current time by using a correction ratio to obtain the corrected pose difference, wherein the correction ration is greater than 0 and less than 1          1203          120

Compensating the reference pose by using the corrected pose difference to obtain a second corrected pose for processing the to-be-display image at the current time          130

Rendering the to-be-display image of the head-mounted display device based on the second corrected pose to display the to-be-display image of the head-mounted display device          140

Determining a pose error change rule based on a pose error sequence, the pose error sequence including pose errors corresponding to a plurality of times respectively          180

Reducing the correction proportionality factor in the case where the pose error corresponding to each time in the target time period is determined to be less than the pose error corresponding to the target time based on the pose error change rule          190          1903

Fig. 11-2

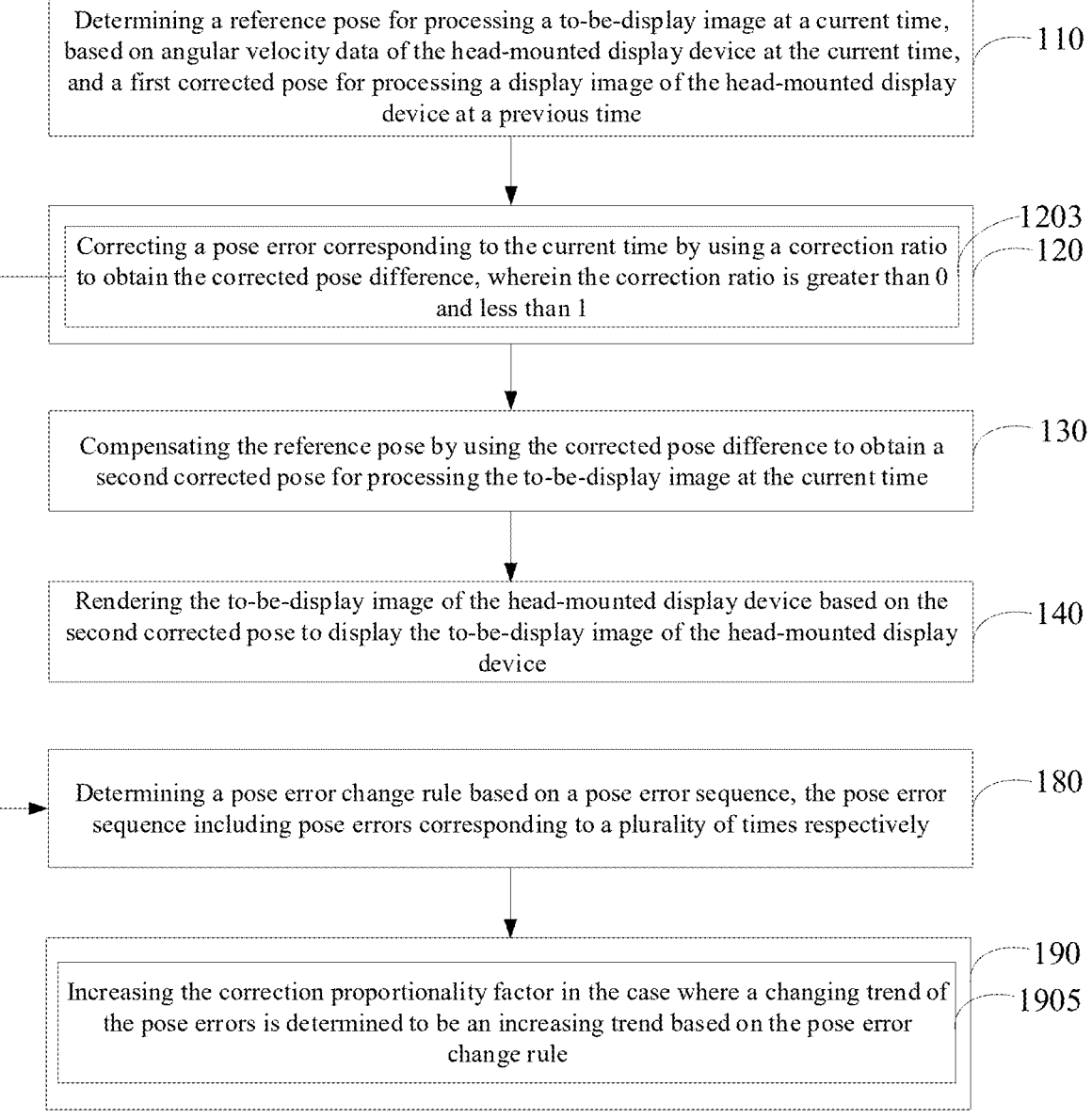

Determining a reference pose for processing a to-be-display image at a current time, based on angular velocity data of the head-mounted display device at the current time, and a first corrected pose for processing a display image of the head-mounted display device at a previous time ⌐110

Correcting a pose error corresponding to the current time by using a correction ratio to obtain the corrected pose difference, wherein the correction ratio is greater than 0 and less than 1 ⌐1203 ⌐120

Compensating the reference pose by using the corrected pose difference to obtain a second corrected pose for processing the to-be-display image at the current time ⌐130

Rendering the to-be-display image of the head-mounted display device based on the second corrected pose to display the to-be-display image of the head-mounted display device ⌐140

Determining a pose error change rule based on a pose error sequence, the pose error sequence including pose errors corresponding to a plurality of times respectively ⌐180

Increasing the correction proportionality factor in the case where a changing trend of the pose errors is determined to be an increasing trend based on the pose error change rule ⌐190 ⌐1905

Fig. 11-3

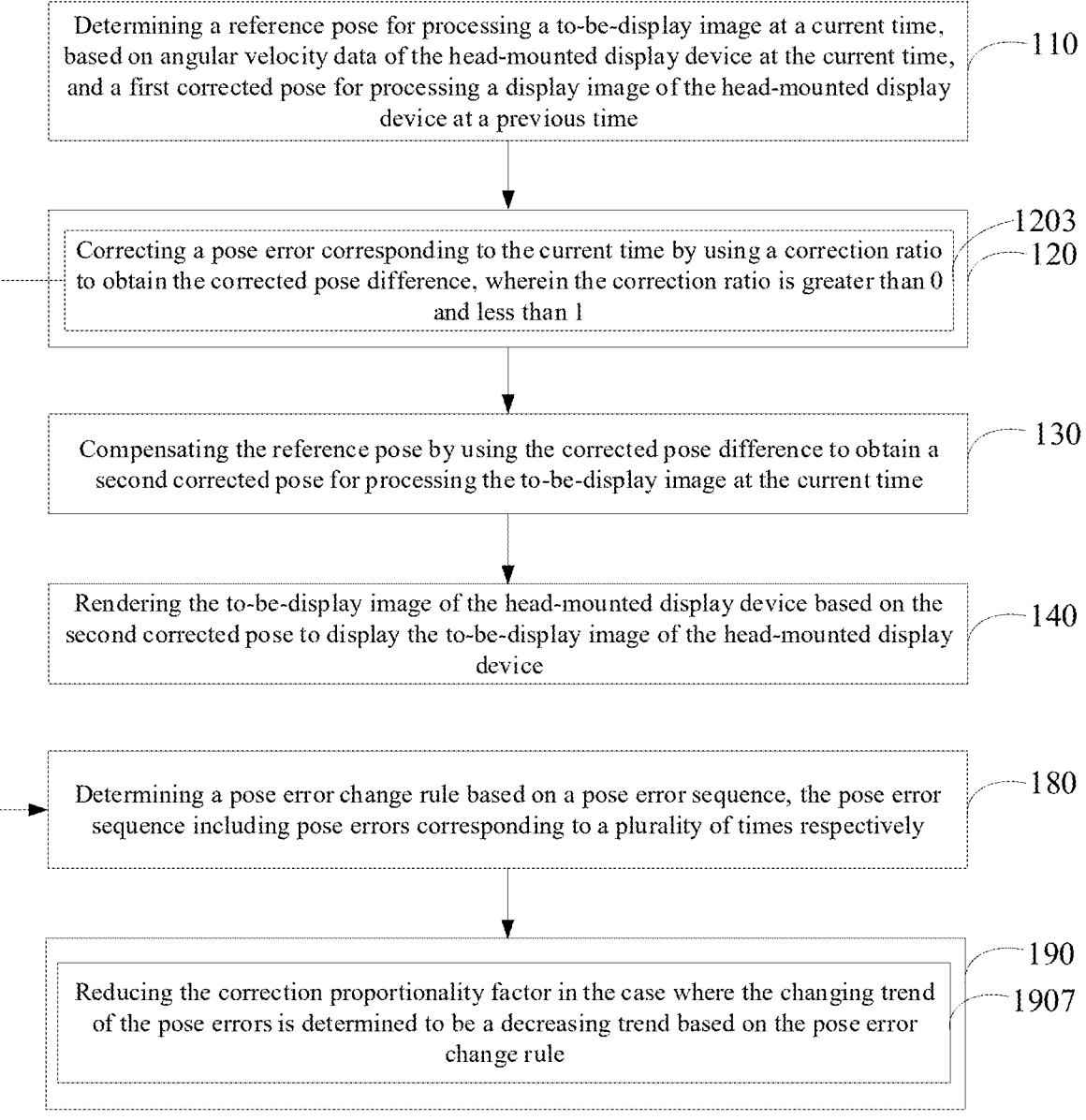

Determining a reference pose for processing a to-be-display image at a current time, based on angular velocity data of the head-mounted display device at the current time, and a first corrected pose for processing a display image of the head-mounted display device at a previous time ⌐—110

Correcting a pose error corresponding to the current time by using a correction ratio to obtain the corrected pose difference, wherein the correction ratio is greater than 0 and less than 1 ⌐—1203 ⌐—120

Compensating the reference pose by using the corrected pose difference to obtain a second corrected pose for processing the to-be-display image at the current time ⌐—130

Rendering the to-be-display image of the head-mounted display device based on the second corrected pose to display the to-be-display image of the head-mounted display device ⌐—140

Determining a pose error change rule based on a pose error sequence, the pose error sequence including pose errors corresponding to a plurality of times respectively ⌐—180

Reducing the correction proportionality factor in the case where the changing trend of the pose errors is determined to be a decreasing trend based on the pose error change rule ⌐—190 ⌐—1907

Fig. 11-4

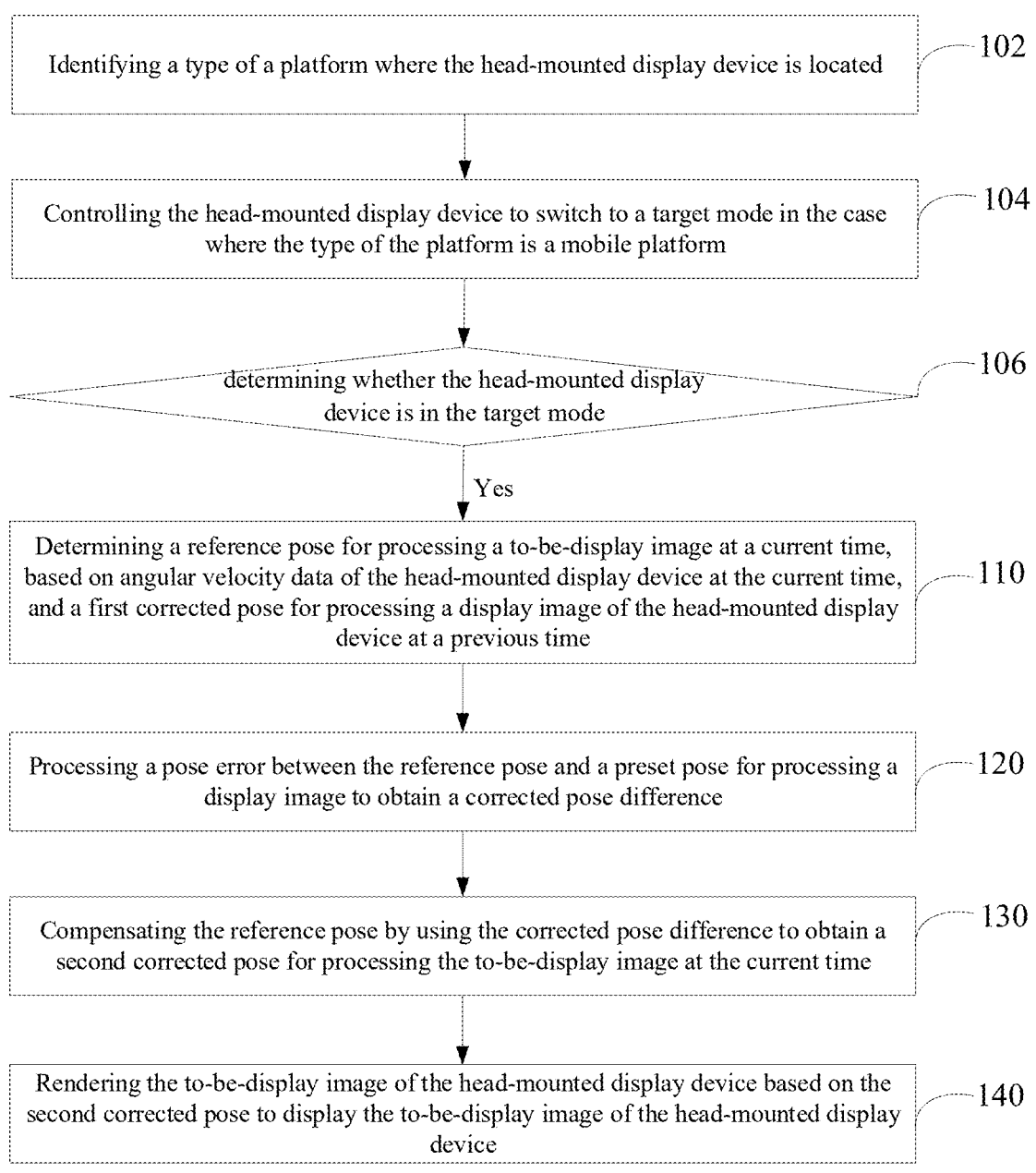

Identifying a type of a platform where the head-mounted display device is located — 102

Controlling the head-mounted display device to switch to a target mode in the case where the type of the platform is a mobile platform — 104 determining whether the head-mounted display device is in the target mode — 106

Yes

Determining a reference pose for processing a to-be-display image at a current time, based on angular velocity data of the head-mounted display device at the current time, and a first corrected pose for processing a display image of the head-mounted display device at a previous time — 110

Processing a pose error between the reference pose and a preset pose for processing a display image to obtain a corrected pose difference — 120

Compensating the reference pose by using the corrected pose difference to obtain a second corrected pose for processing the to-be-display image at the current time — 130

Rendering the to-be-display image of the head-mounted display device based on the second corrected pose to display the to-be-display image of the head-mounted display device — 140

Fig. 12

METHOD AND APPARATUS FOR DISPLAYING IMAGE ON HEAD-MOUNTED DISPLAY DEVICE, AND ELECTRONIC DEVICE

CROSS-REFERENCES TO RELATED APPLICATIONS

The present disclosure is a national phase application of International Application No. PCT/CN2023/093339, filed on May 10, 2023, which claims priority to Chinese patent application No. 202210510750.8, filed with Chinese Patent Office on May 11, 2022, the entireties of which are herein incorporated by reference.

FIELD

The present disclosure relates to the technical field of head-mounted display devices, in particular to a method and apparatus for displaying an image on a head-mounted display device, and an electronic device.

BACKGROUND

Currently, applications of head-mounted display devices are becoming increasingly widespread. During use of a head-mounted display device, bumps, wobbles and the like may occur, which may affect a display effect of the head-mounted display device. How to ensure the display effect of the head-mounted display device in order to improve user experience is a problem to be solved for those skilled in the art.

SUMMARY

Embodiments of the present disclosure provide a method and apparatus for displaying an image on a head-mounted display device, and an electronic device.

According to one aspect of the present disclosure, there is provided a method for displaying an image on a head-mounted display device, including: determining a reference pose for processing a to-be-display image at a current time, based on angular velocity data of the head-mounted display device at the current time and a first corrected pose for processing a display image of the head-mounted display device at a previous time; processing a pose error between the reference pose and a preset pose for processing a display image to obtain a corrected pose difference; compensating the reference pose by using the corrected pose difference to obtain a second corrected pose for processing the to-be-display image at the current time; and rendering the to-be-display image of the head-mounted display device based on the second corrected pose to display the to-be-display image of the head-mounted display device.

According to another aspect of the present disclosure, there is provided a computer-readable storage medium configured to store a computer program, wherein the computer program is configured to execute the above method for displaying an image on a head-mounted display device.

According to yet another aspect of the present disclosure, there is provided an electronic device including: a processor; and a memory configured to store processor executable instructions, wherein the processor is configured to read the executable instructions from the memory and execute the instructions to implement the above method for displaying an image on a head-mounted display device.

The technical solution of the present disclosure is further described in detail below in conjunction with the accompanying drawings and embodiments.

BRIEF DESCRIPTION OF THE DRAWINGS

The above and other objects, features and advantages of the present disclosure will become more apparent from more detailed description of embodiments of the present disclosure in conjunction with the accompanying drawings. The accompanying drawings are used to provide further understanding of embodiments of the present disclosure, and form part of the specification, and are used, together with embodiments of the present disclosure, for explaining the present disclosure, but do not limit the present disclosure. In the accompanying drawings, same reference numerals usually represent same components or steps.

FIG. 1 is a flow diagram of a method for displaying an image on a head-mounted display device provided in an exemplary embodiment of the present disclosure.

FIG. 2 is a schematic diagram of a mode of processing a display image of a head-mounted display device in embodiments of the present disclosure.

FIG. 3 is a schematic diagram of another mode of processing a display image of a head-mounted display device in embodiments of the present disclosure.

FIG. 4 is a schematic diagram of a scenario to which embodiments of the present disclosure are applicable.

FIG. 5 is a flow diagram of a method for displaying an image on a head-mounted display device provided in another exemplary embodiment of the present disclosure.

FIG. 7 is a flow diagram of a method for displaying an image on a head-mounted display device provided in yet another exemplary embodiment of the present disclosure.

FIG. 8 is a flow diagram of a method for displaying an image on a head-mounted display device provided in still another exemplary embodiment of the present disclosure.

FIG. 9 is a flow diagram of a method for displaying an image on a head-mounted display device provided in still yet another exemplary embodiment of the present disclosure.

FIG. 10 is a flow diagram of a method for displaying an image on a head-mounted display device provided in a further exemplary embodiment of the present disclosure.

FIG. 11-1 is a flow diagram of a method for displaying an image on a head-mounted display device provided in a yet further exemplary embodiment of the present disclosure.

FIG. 11-2 is a flow diagram of a method for displaying an image on a head-mounted display device provided in a still further exemplary embodiment of the present disclosure.

FIG. 11-3 is a flow diagram of a method for displaying an image on a head-mounted display device provided in a still yet further exemplary embodiment of the present disclosure.

FIG. 11-4 is a flow diagram of a method for displaying an image on a head-mounted display device provided in another exemplary embodiment of the present disclosure.

FIG. 12 is a flow diagram of a method for displaying an image on a head-mounted display device provided in yet another exemplary embodiment of the present disclosure.

DETAILED DESCRIPTION OF THE DISCLOSURE

Figure 6:
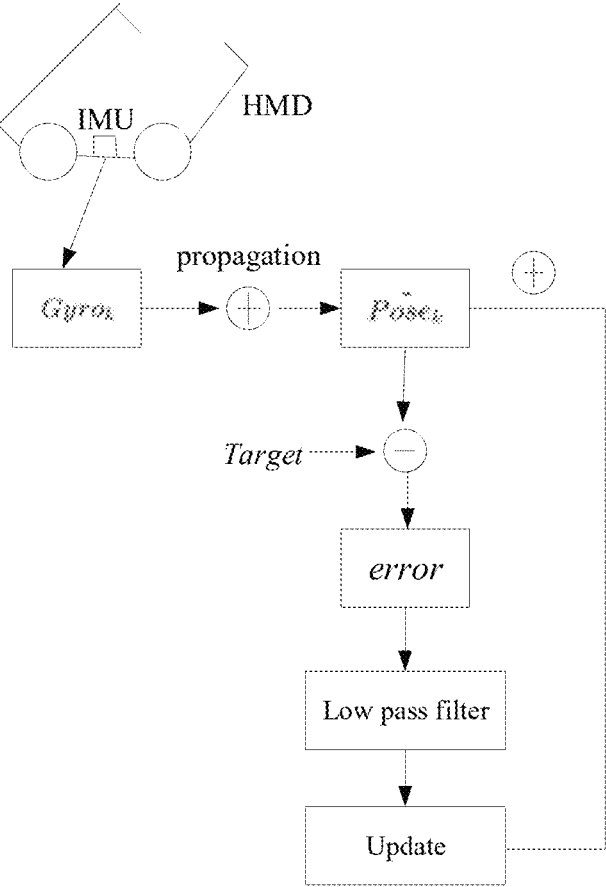
FIG. 6 is a flow diagram of determining a second corrected pose in embodiments of the present disclosure.

Exemplary embodiments according to the present disclosure will be described below in detail with reference to the accompanying drawings. Obviously, the described embodiments are only part of, instead of all of embodiments of the present disclosure. It should be understood that the present disclosure is not limited by the exemplary embodiments described here.

It is to be noted that unless specifically stated otherwise, the relative arrangement of components and steps, numerical expressions and numerical values set forth in these embodiments do not limit the scope of the present disclosure.

It may be understood by those skilled in the art that the terms "first", "second" and the like in the embodiments of the present disclosure are only used to distinguish between different steps, devices or modules, etc., and do not represent any particular technical meaning or indicate an inevitable logical order thereof.

It should also be understood that in embodiments of the present disclosure, "plurality" may refer to two or more, and "at least one" may refer to one, two, or more.

It should also be understood that the number of any component, data, or structure mentioned in embodiments of the present disclosure may generally be understood to be one or more, unless explicitly defined or indicated otherwise by the context.

Additionally, the term "and/or" in the present disclosure merely represents an association relationship describing associated objects, indicating there may be three relationships. For example, A and/or B may indicate three situations: A exists alone; both A and B exist; and B exists alone. Additionally, the character "/" in the present disclosure generally indicates that the associated objects prior to and following it are in an "or" relationship.

It should also be understood that description of the various embodiments in the present disclosure emphasizes differences between the various embodiments. For their identical aspects or similarities, reference may be made to each other, and for the sake of brevity, they will not be described repeatedly.

The following description of at least one exemplary embodiment is actually only illustrative, and in no way serves as any limitation on the present disclosure and its application or use.

Technologies, methods, and devices known to those of ordinary skill in the related art may be not discussed in detail, but where appropriate, the technologies, methods, and devices should be regarded as part of the specification.

It should be noted that similar reference numerals and letters denote similar items in the following drawings, so once a certain item is defined in one drawing, it does not need to be further discussed in subsequent drawings.

Embodiments of the present disclosure may be applied to electronic devices such as terminal devices, computer systems, servers, etc., which may operate with numerous other general-purpose or specialized computing system environments or configurations. Examples of well-known terminal devices, computing systems, environments, and/or configurations suitable for use with electronic devices such as terminal devices, computer systems, servers, etc. include, but are not limited to: personal computer systems, server computer systems, thin clients, thick clients, handheld or laptop devices, microprocessor-based systems, set-top boxes, programmable consumer electronics, network personal computers, minicomputer systems, mainframe computer systems, and distributed cloud computing technology environments that include any system described above, and so on.

Electronic devices such as terminal devices, computer systems, servers, etc. may be described in the general context of computer system executable instructions (such as program modules) executed by a computer system. Typically, program modules may include routines, programs, target programs, components, logic, data structures, and so on, which perform specific tasks or implement specific abstract data types. The computer systems/servers may be implemented in a distributed cloud computing environment, in which tasks are performed by remote processing devices linked through a communication network. In the distributed cloud computing environment, the program modules may be located on a local or remote computing system storage medium that includes a storage device.

Exemplary Method

FIG. 1 is a flow diagram of a method for displaying an image on a head-mounted display device provided in an exemplary embodiment of the present disclosure. The method shown in FIG. 1 may include step 110, step 120, step 130, and step 140. The steps will be described below respectively.

At step 110, a reference pose for processing a to-be-display image at a current time is determined, based on angular velocity data of the head-mounted display device at the current time and a first corrected pose for processing a display image of the head-mounted display device at a previous time.

It is to be noted that the head-mounted display device may also be referred to as a head-mounted display or HMD. The head-mounted display device may be used to achieve an extended reality (XR) effect, such as to achieve an augmented reality (AR) effect, a virtual reality (VR) effect, a mixed reality (MR) effect, etc. Optionally, the head-mounted display device may be used to achieve an AR effect, and in this case, the head-mounted display device may be AR glasses.

In general, the head-mounted display device may include an inertial measurement unit (IMU) and an optical engine. The IMU may include an accelerometer, a gyroscope and a magnetometer, etc. The accelerometer is configured to collect acceleration data, and the gyroscope is configured to collect angular velocity data. The optical engine is an imaging system of the head-mounted display device. The optical engine may include a display screen and an optical element.

Usually, a user may not be able to see a display image of the head-mounted display device directly, and the display image is provided to the user by the following solution. The display screen is configured to emit light for the display image, and the optical element may process the becoming light so that the light for the display image is projected into the eyes of the user, ultimately enabling the user to see the display image. Because there is almost no relative displacement, rotation, or the like between the head-mounted display device and the user while the user is wearing the head-mounted display device, the head-mounted display device moves with the user's movement. Therefore, the display image may need to be processed based on a position and pose of the head-mounted display device (which may actually also be regarded as the user), so that the display image can be positioned at a certain location all the time, or can be in a certain area, or can move with the user's movement, or the like, to match a corresponding application scenario or the user's need.

Before step 110, angular velocity data of the IMU at a current time, such as angular velocity data collected by the gyroscope in the IMU, may be acquired, and a first corrected pose for processing a display image of the head-mounted display device at a previous time may be acquired. The first corrected pose may be obtained in a way similar to a second corrected pose described below, and for clarity of layout, the way in which the first corrected pose is obtained is not elaborated here.

In step 110, integration may be performed using the angular velocity data at the current time and the first corrected pose with reference to a method of integration from an angular velocity to an angular position of the gyroscope, to obtain the reference pose for processing the to-be-display image at the current time (the to-be-display image may be a to-be-display image of the head-mounted display device). Assuming that the angular velocity data at the current time is denoted as $\mathrm{Gyro}_k$, the first corrected pose is denoted as $\mathrm{Pose}_{k-1}$, and the reference pose is denoted as $\tilde{\mathrm{Pose}}_k$, we have:

$$\tilde{\mathrm{Pose}}_k = \mathrm{Pose}_{k-1} \oplus \mathrm{Gyro}_k$$

At step 120, a pose error between the reference pose and a preset pose for processing a display image is processed to obtain a corrected pose difference.

It is to be noted that the preset pose may be a pose that is set for the head-mounted display device in advance and can ensure a display effect of the head-mounted display device. That is, the preset pose may be a pose for processing a display image in order to ensure the display effect.

In an optional example, the preset pose is a pose configured such that a display image of the head-mounted display device is displayed at a preset position in a coordinate system of the head-mounted display device. It may be understood that it may also be a preset position in an IMU coordinate system.

It may be understood that the preset position in the coordinate system of the head-mounted display device may be a fixed position in the coordinate system of the head-mounted display device, the preset position can be a position that can be observed by a user, for example, the display image is displayed at a position directly in front of, to the upper left of, or to the lower right of the head-mounted display device or at other position. It is to be noted that most users' using habit is that a display image is displayed at a position in the center in front of them.

In embodiments of the present disclosure, by setting the preset pose to a pose that matches most users' using habit, the display effect of the head-mounted display device meets the needs of most users as much as possible, which is conducive to improving the usage experience of users.

In an optional example, the preset pose is a pose configured such that a display image of the head-mounted display device is aligned with the direction of gravity (a yaw of the head-mounted display device may be 0 in this pose).

The alignment of the display image of the head-mounted display device with the direction of gravity may be understood as that when a user observes the display image through the head-mounted display device, the plane of the display image extends in a same direction as the direction of gravity in the real world. This can keep the display image substantially perpendicular to the user's horizontal line of sight, which conforms to his viewing habit. It is to be noted that most users' using habit is that the display image of the head-mounted display device is aligned with the direction of gravity. In embodiments of the present disclosure, by setting the preset pose to a pose that matches most users' using habit, the display effect of the head-mounted display device meets the needs of most users as much as possible, which is conducive to improving the usage experience of users.

Of course, a user may also set, according to need, a preset pose that enables a display image of the head-mounted display device to be displayed at a customized position.

In step 120, difference calculation may be performed on the reference pose and the preset pose to obtain a pose error between the reference pose and the preset pose. The pose error may be in a 3×1 axis-angle form. It is to be noted that the difference calculation here is not a simple subtraction, but a generalized function. The "difference" in the difference calculation refers to a difference. The difference calculation may mean a relative rotation between two angles. Assuming that the reference pose is denoted as $\tilde{\mathrm{Pose}}_k$, the preset pose is denoted as Target, and the pose is denoted as error, then we have:

$$\mathrm{error} = \mathrm{Target} \ominus \tilde{\mathrm{Pose}}_k$$

After the pose error is obtained, correction of the pose error may be implemented by processing the pose error, to obtain a corrected pose difference.

It may be understood that the preset pose may be a pose set for the head-mounted display device in advance. In the case where the preset pose and the reference pose are poses in a same coordinate system, and the preset pose is a zero-rotation pose, the reference pose may be used directly as a subsequent quantity to be processed, without the step of performing difference calculation on the reference pose and the preset pose, in order to achieve program optimization for resource conservation. That is, in a subsequent step, the reference pose is directly processed to implement pose error correction, thereby obtaining a corrected pose difference.

At step 130, the reference pose is compensated by using the corrected pose difference to obtain a second corrected pose for processing the to-be-display image at the current time.

In step 130, the corrected pose difference may be a compensation value to updated the reference pose to obtain a second corrected pose for processing the to-be-display image at the current time. The second corrected pose is denoted as $Pose_k$, and we have:

$$Pose_k = \tilde{Pose}_k \oplus error_1$$

It is to be noted that the compensation value here may represent a relative rotation, and updating the reference pose by the compensation value may include superimposing a relative rotation on the reference pose to obtain another pose (i.e., the second corrected pose).

It may be understood that the corrected pose difference is used to update the reference pose to obtain the second corrected pose. Regardless of whether the corrected pose difference is obtained by processing the reference pose or by processing the pose error between the reference pose and the preset pose, the second corrected pose is updated based on the corrected pose difference.

At step 140, rendering the to-be-display image of the head-mounted display device based on the second corrected pose, to display the to-be-display image of the head-mounted display device.

It may be understood that both the first corrected pose and the second corrected pose are poses for processing a display image of the head-mounted display device, and may also be referred to as corrected poses. For example, when the head-mounted display device performs the present method for the first time without a corrected pose at a previous time, a real pose of the head-mounted display device, a preset pose for processing a display image, or other pose that is set in advance, or the like may also be used in place of the corrected pose at a previous time.

It is to be noted that there are various forms of specific implementation of processing the display image of the head-mounted display device based on the second corrected pose or the corrected pose, and they are described below with examples.

In an optional form of implementation, a rendering engine of the head-mounted display device may perform image rendering by using the second corrected pose or the corrected pose to obtain a corresponding display image, and the obtained display image may be updated to the optical engine of the head-mounted display device for display to implement modification of the display image of the head-mounted display device. It is easy to see that this form of implementation uses a software approach to implement processing of the display image of the head-mounted display device. For example, in this solution, overall parameters of the to-be-display image may be adjusted based on the second corrected pose or the corrected pose. The overall parameters may include a three-dimensional size and the like of the display image.

In another optional form of implementation, as shown in FIG. 2, image rendering may be performed based on the second corrected pose (e.g., $Pose_k$ in FIG. 2) or the corrected pose, and a display position of the display image in the display screen (e.g., Display in FIG. 2) of the optical engine of the head-mounted display device is adjusted to implement modification of the display image of the head-mounted display device. Using this form of implementation to implement processing of the display image of the head-mounted display device, for example, the display position of the display image of the head-mounted display device may be adjusted in up, down, left and right directions. For example, in this solution, a two-dimensional size of the to-be-display image may be adjusted based on the second corrected pose or the corrected pose.

In a further optional form of implementation, as shown in FIG. 3, image rendering may be performed based on the second corrected pose or the corrected pose, and the optical engine in the head-mounted display device is configured. For example, an overall position of the optical engine in a head-mounted display module or a position of the display screen in the optical engine may be adjusted by means of an electronic control casing in order to implement modification of the display image of the head-mounted display device (this is equivalent to making a corresponding vibration damping adjustment by holding the display screen in front of a user's eyes). It is easy to see that this form of implementation adopts a hardware approach to implement processing of the display image of the head-mounted display device. Execution logic of this form of implementation may be: second corrected pose→electric control casing→optical engine rotation.

In embodiments of the present disclosure, a reference pose for processing a to-be-display image at a current time may be determined in conjunction with angular velocity data of the head-mounted display device at a current time, and a first corrected pose for processing a display image of the head-mounted display device at a previous time. Next, a pose error between the reference pose and a preset pose for processing a display image may be processed or the reference pose may be processed to obtain a corrected pose difference, and the reference pose is compensated by using the corrected pose difference to obtain a second corrected pose for processing the to-be-display image at the current time. The second corrected pose may be considered to be determined with reference to the angular velocity data of the head-mounted display device at the current time, the first corrected pose and the preset pose, and is adapted to the pose of the head-mounted display device (which may also in fact be regarded as the user) at the current time, and the to-be-display image of the head-mounted display device is rendered based on this pose, which is conducive to correction of a display effect of the head-mounted display device according to a display effect of the head-mounted display device in the preset pose. In this way, regardless of whether small angle changes (bumps, wobbles, shakes, etc.) occur during use of the head-mounted display device or large angle changes (e.g., large angle turns) occur during use of the head-mounted display device, it can ensure that the head-mounted display device correspondingly adjusts its display effect toward the preset pose, thereby improving the usage experience of users.

Optionally, the poses involved in embodiments of the present disclosure may be in the form of a rotation matrix; the corrected poses involved in embodiments of the present disclosure may be poses for image rendering by the rendering engine of the head-mounted display device.

It is to be noted that for the head-mounted display device, there are currently various existing modes for content presentation, which may include a first mode and a second mode. For example, the first mode may be a 3 degree-of-freedom (degree of freedom, dof) mode. In the first mode, the head-mounted display device performs positioning processing on the display image. In this case, a content of the display image of the head-mounted display device is related to a user's pose, and the display image of the head-mounted display device may be rotationally invariant with the world coordinate system. The second mode is similar to a cell phone to TV screen casting mode. In the second mode, the head-mounted display device does not perform positioning processing on the display image. In this case, a content of the display image of the head-mounted display device may be related to a content playback progress and not to a user's pose, and the display image of the head-mounted display device moves with the movement of the user's head. To facilitate description, the second mode may be referred to as a 0 degree-of-freedom (dof) mode.

It may be understood that a user may use the head-mounted display device in a vehicle, vessel, airplane, or other type of movable platform. In the 0 dof mode, the display effect of the head-mounted is acceptable if the movable platform is operating smoothly. Once bumps or wobbles occur, for example, a traveling vehicle bumps or wobbles due to an uneven road surface, or as another example, a traveling airplane bumps or wobbles due to the effect of air currents, it results in that the user will, together with the head-mounted display device, shake or wobble, or the like. In this 0 dof mode, because the display image will also shake or wobble accordingly, the user will not be able to observe the content of the display image of the head-mounted display device stably and clearly, which will degrade the user's usage experience.

In the 3 dof mode, once the above-mentioned bumps or wobbles occur, due to positioning processing on the display image, the positioning of the display image may be unchanged even if the head-mounted display device shakes or wobbles, so the user can clearly see the content of the display image of the head-mounted display device. However, in the case of a directional change (e.g., a 90-degree turn) of the movable platform, since the user (the head-mounted display device) will also change to the same direction as the movable platform, if the positioning of the display image remains unchanged, the user needs to change to the pose before the directional change in order to observe the desired display image, which will also degrade the user's usage experience.

Thus, adopting embodiments of the present disclosure can implement correction of a display effect of the head-mounted display device according to a display effect of the head-mounted display device in the preset pose. For example, the display image of the head-mounted display device may be processed according to the corrected pose, to achieve a display effect similar to that of the 3 dof mode when a small angle change occurs during use of the head-mounted display device, and achieve a display effect similar to that of the 0 dof mode when a large angle change occurs, thereby improving the usage experience of users.

In an optional example, the head-mounted display device is configured to be coupled to a movable platform where the head-mounted display device is located and be movable relative to the movable platform.

It is to be noted that the head-mounted display device may be coupled, through a user, to the movable platform where it is located, and the movable platform may be in a moving state. Optionally, as shown in FIG. 4, the head-mounted display device may be worn on the head of the user (e.g., a passenger in a vehicle), and the head-mounted display device and the user are relatively stationary with respect to each other. The user may sit or stand inside the vehicle, and when the vehicle moves, the user will move with the vehicle. The user may also move within the vehicle (e.g. moving from one position to another, or from facing one direction to another, or the like). Additionally, in the case where the movable platform is of another type, such as a vessel, the user may also sit or stand on a side of the vessel.

It is to be noted that for a scenario in which the head-mounted display device is configured to be coupled to a movable platform where it is located and be movable relative to the movable platform, there may be bumps and wobbles of the movable platform during movement, or steering of the movable platform during movement. In view of this, the method steps of the present disclosure may be performed for the scenario to ensure the display effect of the head-mounted display device and improve the usage experience of users.

It is to be noted that for anti-shaking of display images of a cell phone (or computer) on a movable platform, there is currently a solution: a user manually adjusts a relative position and angle between a real display screen of the cell phone and the user's eyes. That is, the real display screen of the cell phone has a relative displacement and rotation with respect to the user's eyes. In contrast, adopting the anti-shake solution in embodiments of the present disclosure, the head-mounted display device has virtually no relative displacement or rotation with respect to the user's eyes.

Based on the embodiment shown in FIG. 1, as shown in FIG. 5, step 120 includes:

At step 1201, low pass filtering is performed on a pose error corresponding to the current time to obtain the corrected pose difference.

It is to be noted that the pose error obtained by performing difference calculation on the reference pose determined in step 110 and the preset pose is the pose error corresponding to the current time. In the case where the preset pose and the reference pose are poses in a same coordinate system, and the preset pose is a zero-rotation pose, low pass filtering may be performed on the reference pose to obtain the corrected pose difference.

Optionally, low pass filtering may be performed on the pose error corresponding to the current time by a low pass filter such as an infinite impulse response (IIR) digital filter, a finite impulse response (FIR) digital filter, or the like. Each output value of the IIR digital filter may depend only on one previous sampling value, which is very convenient for engineering applications. A low pass filtering process of the FIR digital filter involves a sliding window, and each output value of the FIR digital filter may be obtained by calculation based on a number of previous sampling values. Assuming that the pose error corresponding to the current time is denoted as error, and the corrected pose difference is denoted as $error_1$, we have:

$$error_1 = LowPassfilter(error)$$

It may be understood that in ideal conditions, only data below a cut-off frequency can pass, such that the value of the corrected pose difference $error_1$ is not 0, i.e. the second corrected pose obtained subsequently after the reference pose is compensated by using the corrected pose difference $error_1$ is different from the reference pose. Data above the cutoff frequency cannot pass, such the value of the corrected pose difference $error_1$ is 0, i.e. the second corrected pose obtained subsequently after the reference pose is compensated by using the corrected pose difference $error_1$ is same as the reference pose. However, in actual working conditions, it may be rare for the value of the corrected pose difference $error_1$ to be 0. The value may be too small to be noticed by a user.

In embodiments of the present disclosure, as shown in FIG. 6, after angular velocity data $Gyro_k$ at a current time collected by a gyroscope in an IMU is acquired, integration may be performed using the angular velocity data $Gyro_k$ at the current time and a first corrected pose $Pose_{k-1}$ for processing a display image of the head-mounted display device at a previous time to obtain a reference pose $\tilde{P}ose_k$ for processing a to-be-display image at the current time. By performing difference calculation on $\tilde{P}ose_k$ and a preset pose Target, a corresponding pose error error corresponding to the current time may be obtained. For example, by performing low pass filtering on error, a corrected pose difference $error_1$ may be obtained. $error_1$ may be a compensation value to updated $\tilde{P}ose_k$ to finally obtain a second corrected pose $Pose_k$. $Pose_k$ may be regarded as a pose that can achieve anti-shaking. $Pose_k$ may be used for processing the to-be-display image at the current time. It is to be noted that FIG. 6 presents a method of obtaining $Pose_k$ by using $Pose_{k-1}$ as an input, and a similar method may also be used subsequently to obtain $Pose_{k+1}$ by using $Pose_k$ as an input, obtain $Pose_{k+2}$ by using $Pose_{k+1}$ as an input, and so on. In this way, by low pass filtering on the pose error, high-frequency shakes and wobbles (e.g., small-angle movements within a short period of time) may be filtered out, and the display image of the head-mounted display device will tend to be motionless, thereby facilitating a user clearly and stably observing the content of the display image of the head-mounted display device, which can improve the user's usage experience. Additionally, low-frequency movements (e.g., large-angle movements for a long period of time) will be retained. If the user turns his head or the movable platform turns (e.g., the movable platform turns, causing the head to turn therewith), resulting in a large-angle movement of the head-mounted display device, then after compensation, the display image of the head-mounted display device will be positioned by following the user's head so as to facilitate the user observing the desired display image, which can also improve the user's usage experience.

Based on the embodiment shown in FIG. 5, as shown in FIG. 7, step 1201 includes:

At step 12011, low pass filtering is performed on the pose error corresponding to the current time by a low pass filter.

The method further includes step 150 and step 160.

At step 150, a user input operation is received.

Optionally, the user input operation includes, but is not limited to, a voice input operation, a touch input operation, etc. For example, a user input operation may be an operation of a user voice saying "Adjust the cutoff frequency to 2 hz (it may also be 5 hz or other frequency)". Alternatively, the head-mounted display device may have a handle paired therewith, and the user input operation may be an operation of a user clicking a cutoff frequency adjustment button on the handle. Alternatively, a cutoff frequency selection box or input box can also be displayed on the display image, and a user may directly select or input a desired cutoff frequency.

At step 160, a cutoff frequency of the low pass filter is adjusted in response to the user input operation.

In step 160, a cutoff frequency desired by the user may be determined according to the user input operation, and then the cutoff frequency of the low pass filter may be adjusted to the cutoff frequency desired by the user in any implementable manner.

In conjunction with the description above, it can be seen that by low pass filtering of the low pass filter, in the case where a movement frequency of the head-mounted display device is not higher than the cut-off frequency of the low pass filter, the display image of the head-mounted display device changes by following the movement of the head-mounted display device, and in the case where the movement frequency of the head-mounted display device is higher than the cut-off frequency of the low pass filter, the display image of the head-mounted display device tends to be motionless. It may be understood that the method may be less sensitive to movements closer to the cutoff frequency. Thus, the more the movement frequency of the head-mounted display device is higher than the cut-off frequency, the closer the actual mode of the head-mounted display device is to the 3 dof mode. The more the movement frequency of the head-mounted display device is lower than the cut-off frequency, the closer the actual mode of the head-mounted display device is to the 0 dof mode. Therefore, it may be understood that the higher the cut-off frequency is, the more likely that the frequencies of most movements may be below the cut-off frequency, in which case the solution will compensate for most movements of the head-mounted display device in such a way as to make the display image follow the movements of the head-mounted display device, such that the actual mode of the head-mounted display device is closer to the 0 dof mode. The lower the cutoff frequency is, the more likely that the frequencies of most movements may be higher than the cut-off frequency, in which case the solution will compensate for most movements of the head-mounted display device in such a way as to make the display image tend to be motionless, such that the actual mode of the head-mounted display device is closer to the 3 dof mode.

In embodiments of the present disclosure, by adjusting the cut-off frequency of the low pass filter, a user can make the actual mode of the head-mounted display device closer to the 0 dof mode or closer to the 3 dof mode, according to actual need.

It is to be noted that described above is a situation in which the cutoff frequency of the low pass filter is adjustable. In specific implementation, the cutoff frequency of the low pass filter may also be set to a non-adjustable constant value.

Based on the embodiment shown in FIG. 1, as shown in FIG. 8, step 120 includes:

At step 1203, a pose error corresponding to the current time is corrected by using a correction ratio to obtain the corrected pose difference, wherein the correction ratio is greater than 0 and less than 1.

Optionally, the correction ratio may be 0.2, 0.5, 0.6, 0.8 or other value between 0 and 1, which will not be listed here.

It may be understood that in the case where the preset pose and the reference pose are poses in a same coordinate system, and the preset pose is a zero-rotation pose, the reference pose may be corrected using the correction ratio to obtain the corrected pose difference.

In step 1203, the pose error corresponding to the current time may be multiplied by the correction ratio, and a multiplication result may be used as the corrected pose difference.

It may be understood that in the case where shakes and wobbles occur, causing a reciprocating movement of the head of a user, it results in both positive and negative actual poses of the head-mounted display device, and both positive and negative pose errors. After compensation, the display image of the head-mounted display device will tend to be motionless, thereby facilitating the user clearly and stably observing the content of the display image of the head-mounted display device, which can improve the user's usage experience. Additionally, if the user turns his head or the movable platform turns (e.g., the movable platform turns, causing the head to turn therewith), resulting in a direction-change movement of the head-mounted display device, an actual pose of the head-mounted display device will be positive or negative all the time, and the pose error will be positive or negative all the time. After compensation, the display image of the head-mounted display device will follow the orientation of the user's head to facilitate the user observing the desired display image, which can also improve the user's usage experience.

It is to be noted that the larger the correction ratio, the closer the corrected pose difference is to the pose error, such that when the corrected pose difference is used in the determination of the second corrected pose, the second corrected pose is closer to the preset pose. Accordingly, the modification of the display image of the head-mounted display device will be faster. Thus, the larger the correction ratio is, the closer the actual mode of the head-mounted display device is to the 0 dof mode; and the smaller the correction ratio is, the closer the actual mode of the head-mounted display device is to the 3 dof mode.

In embodiments of the present disclosure, by introducing the correction ratio to correct the pose error, the corrected pose of the head-mounted display device may be close to the preset pose, and the corrected pose is used for rendering the display image of the head-mounted display device, which is conducive to correction of a display effect of the head-mounted display device according to a display effect of the head-mounted display device in the preset pose. In this way, regardless of whether small angle changes (bumps, wobbles, shakes, etc.) occur during use of the head-mounted display device or large angle changes (e.g., large angle turns) occur during use of the head-mounted display device, it can ensure that the head-mounted display device correspondingly adjusts its display effect toward the preset pose, thereby improving the usage experience of users. Moreover, by controlling the correction ratio, a user can make the actual mode of the head-mounted display device closer to the 0 dof mode or closer to the 3 dof mode, according to actual need.

Based on the embodiment shown in FIG. 8, as shown in FIG. 9, the method further includes:

At step 115, the correction ratio is determined based on compensation reference information, the compensation reference information including at least one of: the pose error corresponding to the current time, an accumulated value of pose errors, an environmental condition of a movable platform where the head-mounted display device is located, and steering information of the movable platform.

Optionally, step 115 may be performed before step 120. That is, after the correction ratio is determined based on compensation reference information, correction of the pose error is performed using the determined correction ratio. Alternatively, step 115 may be performed after step 120, i.e., after correction of the pose error is performed using the correction ratio, the correction ratio may be determined based on compensation reference information, so that dynamic updating of the correction ratio is performed using a determination result. In this way, the updated correction ratio may subsequently be used for pose error correction. Embodiments of the present disclosure do not impose any limitation on the order in which steps 115 and 120 are performed. Thus, it may be understood that the correction ratio in embodiments of the present disclosure may be dynamically adjusted based on the above factors.

It may be understood that in the case where the preset pose and the reference pose are poses in a same coordinate system, and the preset pose is a zero-rotation pose, the pose error corresponding to the current time and the accumulated value of pose errors may be understood as: a reference pose corresponding to the current time and an accumulated value of reference poses.

The environmental condition of the movable platform where the head-mounted display device is located may be determined based on information collected by devices mounted on the platform (e.g., cameras, radar, etc.). In the case where the movable platform where the head-mounted display device is located is a vehicle, the environmental condition of the movable platform where the head-mounted display device is located may include road surface information of a road surface on which the vehicle is located. The road surface information may include road surface roughness. In the case where the movable platform where the head-mounted display device is located is an airplane, the environmental condition of the movable platform where the head-mounted display device is located may include air current strength at a location where the airplane is located.

The steering information of the movable platform where the head-mounted display device is located may include a steering degree. The steering degree may be characterized using a steering angle. In the case where the movable platform is a vehicle, the steering information may be detected by an on-board steering system.

Optionally, the correction ratio is positively correlated with the pose error corresponding to the current time.

The larger the difference between the reference pose and the preset pose, the larger the correction ratio. The larger correction ratio is conducive to more quickly modifying the display image of the head-mounted display device according to the preset pose, thereby being conducive to ensuring the display effect of the head-mounted display device.

Optionally, the correction ratio is positively correlated with the accumulated value of pose errors. The accumulated value of pose errors may be an accumulated value of pose errors over a preset time period, and may also be an accumulated value of continuous pose errors. Compared with the above examples, the correction ratio is determined by an overall movement trend before the image is displayed, which enables the correction ratio to more closely match an actual pose error. For example, when the movable platform makes a large-angle turn, the display image of the head-mounted display device can be quickly modified based on the preset pose, thereby being conducive to ensuring display effect of the head-mounted display device.

It may be understood that a value of the pose error may be a positive number, and may also be a negative number. For example, if a value of the pose error towards a first direction is defined to be positive, then a value of the pose error towards a second direction, which is opposite to the first direction, is negative. Both the positive and negative pose errors can be processed arithmetically. In evaluating the pose error as being "large", "small" or "positively correlated with . . . ", it may be evaluated with reference to an absolute value of the pose error.

Optionally, the environmental condition includes road surface roughness, and the correction ratio is positively correlated with the road surface roughness. Thus, the more uneven a road surface is, the smaller the correction ratio is. The smaller correction ratio allows the modification of the display image of the head-mounted display device according to the preset pose to be slower, thereby being conducive to ensuring the stability of the display image of the head-mounted display device.

Optionally, the steering information includes a steering degree, and the correction ratio is positively correlated with the steering degree. Thus, the larger a direction change of the movable platform, the larger the correction ratio. The larger correction ratio is conducive to more quickly modifying the display image of the head-mounted display device according to the preset pose, thereby being conducive to ensuring a following effect of the display image of the head-mounted display device.

In embodiments of the present disclosure, the correction ratio may be reasonably determined with reference to at least one of the pose error corresponding to the current time, the environmental condition of the movable platform where the head-mounted display device is located, and the steering information of the movable platform, so that the determined correction ratio is adapted to an actual situation.

Of course, it may be understood that similar to the cutoff frequency adjustment solution, a user may also adjust the above correction ratio according to usage need.

Based on the embodiment shown in FIG. 8, as shown in FIG. 10, the method further includes steps 180 and 190.

At step 180, a pose error change rule is determined based on a pose error sequence, the pose error sequence including pose errors corresponding to a plurality of times respectively.

It is to be noted that after the reference pose corresponding to the current time is determined by performing step 110, a pose error corresponding to the current time may be determined by performing difference calculation on the reference pose corresponding to the current time and a preset pose. In a similar manner, a corresponding pose error may be determined for each time, and a plurality of pose errors in one-to-one correspondence with a plurality of times may be obtained in this way. The plurality of pose errors may be arranged in an early to late order of the corresponding times to form a pose error sequence.

It may be understood that in the case where the preset pose and the reference pose are poses in a same coordinate system, and the preset pose is a zero-rotation pose, a pose error change rule may be determined based on the reference pose sequence.

In an optional example, the pose error sequence may include 20 pose errors arranged sequentially: R1, R2, R3, . . . , R20. A time corresponding to R1 may be t1, a time corresponding to R2 may be t2, a time corresponding to R3 may be t3, . . . , a time corresponding to R20 may be t20. Optionally, t20 may be the current time.

By analyzing the pose error sequence, a pose error change rule may be determined. The pose error change rule includes, but is not limited to, the following information: whether an overall changing trend of the pose errors is an increasing trend or a decreasing trend; which times correspond to a maximum value and a minimum value of the pose errors, respectively; how many local maximums and how many local minimums there are in the pose errors; which times correspond to the local maximums and the minimal values, respectively; a magnitude relationship between a pose error at each time after a certain time (which may be considered as a reference time) and a pose error corresponding to the reference time.

At step 190, the correction ratio is adjusted based on the pose error change rule.

It is to be noted that there are various forms of implementation of step 190, and they are described below with examples.

In an optional form of implementation, as shown in FIG. 11-1, step 190 includes the followings.

At step 1901, the correction ratio is increased in the case where a pose error corresponding to each time in a target time period is determined to be greater than or equal to a pose error corresponding to a target time based on the pose error change rule.

Each of the target time, a starting time of the target time period, and an ending time of the target time period is one of the plurality of times, respectively, the starting time of the target time period being later than the target time, and a duration of the target time period is greater than or equal to a preset duration.

Optionally, the preset duration may be 3 seconds, 4 seconds, 5 seconds, 8 seconds or other duration, which will not be listed here.

In an optional example, the pose error sequence may include 20 pose errors arranged sequentially: R1, R2, R3, . . . , R20. A time corresponding to R1 may be t1, a time corresponding to R2 may be t2, a time corresponding to R3 may be t3, . . . , a time corresponding to R20 may be t20. Optionally, t20 may be the current time.

Assuming t13 of t1 to t20 as the target time, a magnitude relationship between each of R14 to R20 and R13 may be included in the pose error change rule. Assuming that an interval between any two adjacent times is 0.5 seconds, the preset duration is 3 seconds, the starting time of the target time period is t14, and the ending time of the target time period is t20, then in the case where each of R14 to R20 is greater than or equal to R13, it may be considered that the pose errors have been consistently high since the time t13. That is, if the pose error is corrected based on the current correction ratio, a correction effect may be not satisfactory. In this case, the correction ratio may be increased. For example, the correction ratio may be adjusted from 0.5 to 0.6 or 0.7. By increasing the correction ratio, the display image of the head-mounted display device may be corrected more quickly based on the preset pose, thereby being conducive to ensuring the display effect of the head-mounted display device.

In another optional form of implementation, as shown in FIG. 11-2, step 190 includes the followings.

At step 1903, the correction ratio is reduced in the case where the pose error corresponding to each time in the target time period is determined to be less than the pose error corresponding to the target time based on the pose error change rule.

The target time, a starting time of the target time period, and an ending time of the target time period are each one of the plurality of times, respectively, the starting time of the target time period being later than the target time, and a duration of the target time period is greater than or equal to a preset duration.

Optionally, the preset duration may be 3 seconds, 4 seconds, 5 seconds, 8 seconds or other duration, which will not be listed here.

Continuing with the example from the previous form of implementation, in the case where each of R14 to R20 is less than R13, it may be considered that the pose errors have been consistently low since the time t13. That is, if the pose error is corrected based on the current correction ratio, a correction effect may meet the requirement. In this case, the correction ratio may be reduced. For example, the correction ratio may be adjusted from 0.5 to 0.3 or 0.4. By reducing the correction ratio, the modification of the display image of the head-mounted display device according to the preset pose may be slower, thereby being conducive to ensuring the stability of the display image of the head-mounted display device.

In a further optional form of implementation, step 190, as shown in FIG. 11-3, includes the followings.

At step 1905, the correction ratio is increased in the case where a changing trend of the pose errors is determined to be an increasing trend based on the pose error change rule.

Assuming that a changing trend of the pose errors is determined to be an increasing trend based on the pose error change rule, for example, continuing with the example in the first form of implementation, if R1, R2, R3, . . . , and R20 increase sequentially, or although R1, R2, R3, . . . , R20 do not increase sequentially, its overall trend is a progressive increase (e.g., the first 10 pose errors of the 20 pose errors increase sequentially, the 11th and 12th pose errors are same, and the last 8 pose errors increase sequentially), then the correction ratio may be increased. For example, the correction ratio may be adjusted from 0.5 to 0.6 or 0.7. By increasing the correction ratio, the display image of the head-mounted display device may be modified more quickly based on the preset pose, thereby being conducive to ensuring the display effect of the head-mounted display device.

In yet another optional form of implementation, as shown in FIG. 11-4, step 190 includes the followings.

At step 1907, the correction ratio is reduced in the case where the changing trend of the pose errors is determined to be a decreasing trend based on the pose error change rule.

Assuming that the changing trend of the pose errors is determined to be a decreasing trend based on the pose error change rule, for example, continuing with the example in the first form of implementation, if R1, R2, R3, . . . , R20 decrease sequentially, or although R1, R2, R3, . . . , R20 do not decrease sequentially, an overall trend is to a progressive decrease (e.g., the first 10 pose errors of the 20 pose errors decrease sequentially, the 11th and 12th pose errors are same, and the last 8 pose errors decrease sequentially), then the correction ratio may be reduced. For example, the correction ratio may be adjusted from 0.5 to 0.3 or 0.4. By reducing the correction ratio, the modification of the display image of the head-mounted display device according to the preset pose may be slower, thereby being conducive to ensuring the stability of the display image of the head-mounted display device.

Hence, in embodiments of the present disclosure, by adjusting the proportionality factor with reference to the pose error change rule, the display image of the head-mounted display device may be modified at a more appropriate speed according to an actual situation, thereby ensuring the display effect and display image stability of the head-mounted display device.

Based on the embodiment shown in FIG. 1, as shown in FIG. 12, the method further includes steps 102, 104 and 106.

At step 102, a type of a platform where the head-mounted display device is located is identified.

It is to be noted that there are various forms of implementation of identifying a type of a platform where the head-mounted display device is located, and they are described below with examples.

In an optional form of implementation, a communication connection may be established between the head-mounted display device and the platform where it is located, and the head-mounted display device may acquire relevant information of the platform in the process of establishing the communication connection. The relevant information of the platform includes, but is not limited to, identification information, type information, etc. By extracting the type information from the acquired relevant information and identifying a category characterized by the type information, it may be determined whether the type of the platform is a movable platform.

In another optional form of implementation, the head-mounted display device may also include a camera. The head-mounted display device may capture, by the camera, an image of an environment where it is located, and perform target detection on the image to determine whether the image matches a movable platform such as a vehicle. In the case of a match, it may be determined that the type of the platform where the head-mounted display device is located is a movable platform; otherwise, it may be determined that the type of the platform where the head-mounted display device is located is not a movable platform.

In a further optional form of implementation, acceleration data collected by an accelerometer or angular velocity data collected by a gyroscope in an IMU of the head-mounted display device may be acquired and compared with a threshold that is set in advance. If it is determined, based on the acceleration data, that an acceleration of the head-mounted display device is greater than a set acceleration threshold, or it is determined, based on the angular velocity data, that an angular velocity of the head-mounted display device is greater than a set angular velocity threshold, then the type of the platform where the head-mounted display device is located may be determined to be a movable platform. Otherwise, the type of the platform where the head-mounted display device is located may be determined not to be a movable platform.

At step 104, the head-mounted display device is controlled to switch to a target mode in the case where the type of the platform is a movable platform.

In embodiments of the present disclosure, the head-mounted display device may include at least three modes. The at least three modes may include a 0 dof mode and a 3 dof mode as described above, and a target mode in step 104.

At step 106, whether the head-mounted display device is in the target mode is determined, and if so, step 110 is triggered.

In embodiments of the present disclosure, a type of a platform where the head-mounted display device is located may be identified, and in the case where the category of the platform is not a movable platform, the head-mounted display device may be set to a conventional 0 dof mode or 3 dof mode. In the case where the category of the platform is a movable platform, the head-mounted display device may be automatically switched to the target mode, so as to trigger step 110 in the target mode to implement the execution of steps 110 to 140 above. As described above, the target mode is a mode between the 0 dof mode and the 3 dof mode. In the target mode, when the movable platform bumps or wobbles, the display image of the head-mounted display device may be adjusted to compensate for the bumps and wobbles, thereby keeping the image stable. Moreover, when the movable platform or the head of a user turns, the display image of the head-mounted display device may be positioned by following the user's head, thereby improving the user's usage experience.

It is to be noted that described above is automatic switching of the head-mounted display device to the target mode in the case where the head-mounted display device is located on a movable platform. Of course, a user may also manually set the head-mounted display device to any of the 0 dof mode, the 3 dof mode or the target mode, according to actual need.

It is to be noted that the movable platform involved in embodiments of the present disclosure may also be referred to as a motion carrier; and the angular velocity data in embodiments of the present disclosure may also be collected not by the gyroscope in the IMU but by other sensor capable of obtaining the angular velocity data.

In summary, in embodiments of the present disclosure, without using the acceleration data collected by the IMU, a display effect of the head-mounted display device may be corrected all the time according to a display effect of the head-mounted display device in the preset pose, by using the angular velocity data collected by the IMU. For the head-mounted display device, the display effect can be guaranteed regardless of a small-angle movement in a short period of time or a large-angle movement in a long period of time.

Any method for displaying an image on a head-mounted display device provided in embodiments of the present disclosure may be executed by any suitable device having data processing capabilities, including, but not limited to a terminal device and a server, etc. Alternatively, any method for displaying an image on a head-mounted display device provided in embodiments of the present disclosure may be executed by a processor. For example, the processor executes any method for displaying an image on a head-mounted display device mentioned in embodiments of the present disclosure, by calling corresponding instructions stored in a memory. This will not be described here.

Embodiments of the present disclosure also provide a method for displaying an image on a head-mounted display device, the method including: acquiring angular velocity data of the head-mounted display device; determining a reference pose for processing a to-be-display image, based on the angular velocity data and a previous first corrected pose for processing a display image of the head-mounted display device; processing the reference pose to obtain a corrected pose difference; compensating the reference pose by using the corrected pose difference to obtain a second corrected pose for processing the to-be-display image; and rendering the to-be-display image of the head-mounted display device based on the second corrected pose, to display the to-be-display image of the head-mounted display device.

Embodiments of the present disclosure also provide a method for displaying an image on a head-mounted display device, the method including: acquiring angular velocity data of the head-mounted display device; determining a reference pose for processing a to-be-display image, based on the angular velocity data and a previous first corrected pose for processing a display image of the head-mounted display device; processing a pose error between the reference pose and a preset pose for processing a display image to obtain a corrected pose difference; compensating the reference pose by using the corrected pose difference to obtain a second corrected pose for processing the to-be-display image; and rendering the to-be-display image of the head-mounted display device based on the second corrected pose, to display the to-be-display image of the head-mounted display device.

Embodiments of the present disclosure also provide a method for displaying an image on a head-mounted display device, the method including: determining a reference pose for processing a to-be-display image at a current time, based on angular velocity data of the head-mounted display device at the current time and a first corrected pose for processing a display image of the head-mounted display device at a previous time; processing the reference pose to obtain a corrected pose difference; compensating the reference pose by using the corrected pose difference to obtain a second corrected pose for processing the to-be-display image at the current time; and rendering the to-be-display image of the head-mounted display device based on the second corrected pose, to display the to-be-display image of the head-mounted display device.

In some optional embodiments, in response to a user selection, an image displaying mode of the head-mounted display device is switched to one of a 0 degree-of-freedom mode, a target mode, and a 3 degree-of-freedom mode. In the case where the head-mounted display device is in the target mode, the step of determining a reference pose for processing a to-be-display image at a current time, based on angular velocity data of the head-mounted display device at the current time, and a first corrected pose for processing a display image of the head-mounted display device at a previous time is performed.

In some optional embodiments, the method for displaying an image on a head-mounted display device further includes: receiving a user input operation; and adjusting the correction ratio in response to the user input operation.

In some optional embodiments, the method for displaying an image on a head-mounted display device further includes: after correction of the pose error is performed using the correction ratio, the correction ratio may be determined based on compensation reference information, so that dynamic updating of the correction ratio is performed using a determination result.

Exemplary Apparatus

Figure 13:
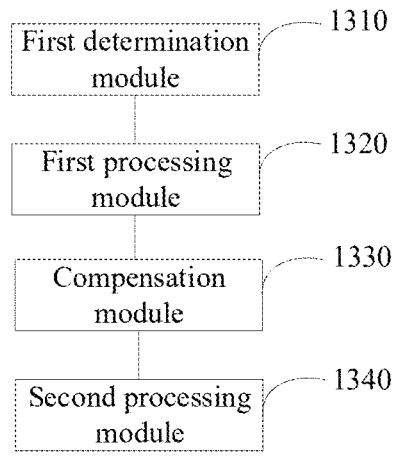
FIG. 13 is a structural diagram of an apparatus for displaying an image on a head-mounted display device provided in an exemplary embodiment of the present disclosure.

FIG. 13 is a structural diagram of an apparatus for displaying an image on a head-mounted display device provided in an exemplary embodiment of the present disclosure. The apparatus shown in FIG. 13 includes a first determination module 1310, a first processing module 1320, a compensation module 1330, and a second processing module 1340.

The first determination module 1310 is configured to determine a reference pose for processing a to-be-display image at a current time, based on angular velocity data of the head-mounted display device at the current time, and a first corrected pose for processing a display image of the head-mounted display device at a previous time.

The first processing module 1320 is configured to process a pose error between the reference pose and a preset pose for processing a display image to obtain a corrected pose difference.

The compensation module 1330 is configured to compensate the reference pose by using the corrected pose difference to obtain a second corrected pose for processing the to-be-display image at the current time.

The second processing module 1340 is configured to render the to-be-display image of the head-mounted display device based on the second corrected pose to display the to-be-display image of the head-mounted display device.

In an optional example, the first processing module 1320 is configured to:

perform low pass filtering on a pose error corresponding to the current time to obtain the corrected pose difference.

In an optional example, the first processing module 1320 is configured to:

perform low pass filtering on the pose error corresponding to the current time by a low pass filter.

Figure 14:
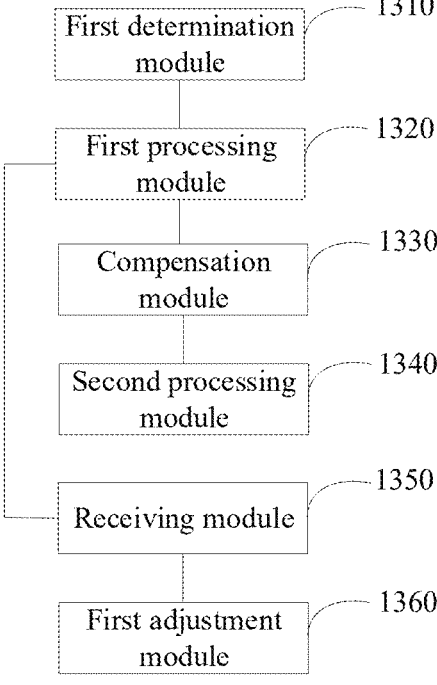
FIG. 14 is a structural diagram of an apparatus for displaying an image on a head-mounted display device provided in another exemplary embodiment of the present disclosure.

As shown in FIG. 14, the apparatus further includes:

a receiving module 1350 configured to receive a user input operation; and a first adjustment module 1360 configured to adjust a cutoff frequency of the low pass filter in response to the user input operation.

In an optional example, the first processing module 1320 is configured to:

correct a pose error corresponding to the current time by using a correction ratio to obtain the corrected pose difference, wherein the correction ratio is greater than 0 and less than 1.

Figure 15:
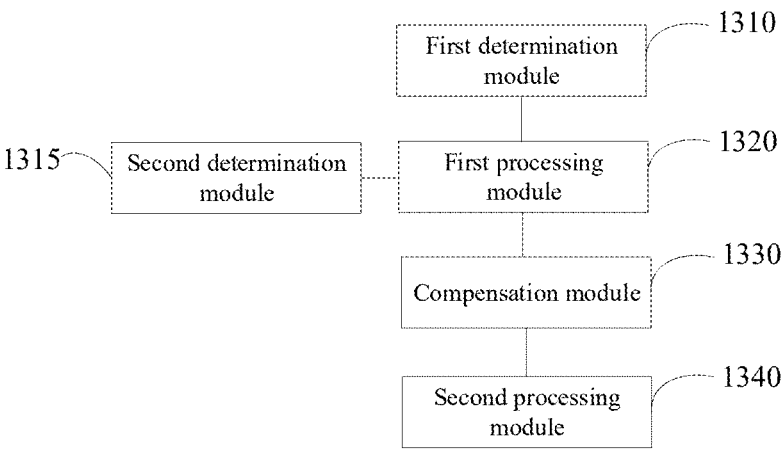
FIG. 15 is a flow diagram of an apparatus for displaying an image on a head-mounted display device provided in yet another exemplary embodiment of the present disclosure.

In an optional example, as shown in FIG. 15, the apparatus further includes:

a second determination module 1315 configured to determine the correction ratio based on compensation reference information, the compensation reference information including at least one of: the pose error corresponding to the current time, an accumulated value of pose errors, an environmental condition of a movable platform where the head-mounted display device is located, and steering information of the movable platform.

In an optional example, at least one of the following four items is met:

the correction ratio is positively correlated with the pose error corresponding to the current time;

the correction ratio is positively correlated with the accumulated value of pose errors;

the environmental condition includes road surface roughness, and the correction ratio is positively correlated with the road surface roughness; and the steering information includes a steering degree, and the correction ratio is positively correlated with the steering degree.

Figure 16:
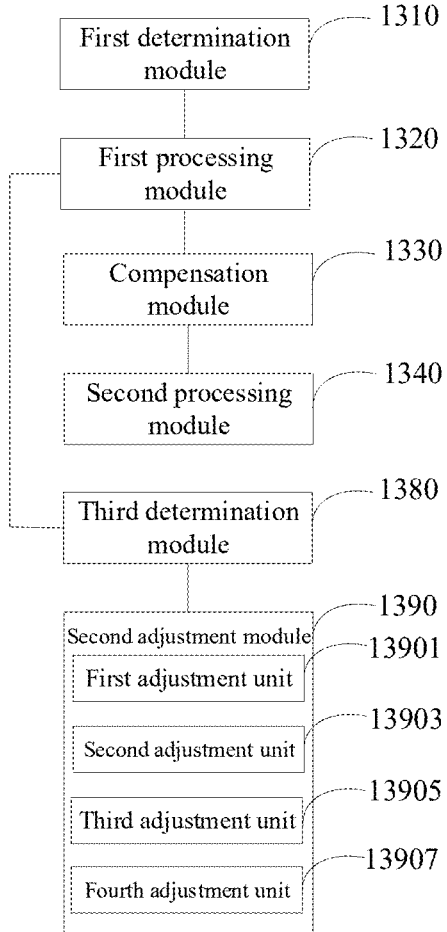
FIG. 16 is a flow diagram of an apparatus for displaying an image on a head-mounted display device provided in still another exemplary embodiment of the present disclosure.

In an optional example, as shown in FIG. 16, the apparatus further includes:

a third determination module 1380 configured to determine a pose error change rule based on a pose error sequence, the pose error sequence including pose errors corresponding to a plurality of times respectively; and a second adjustment module 1390 configured to adjust the correction ratio based on the pose error change rule.

In an optional example, the second adjustment module 1390 includes at least one of a first adjustment unit 13901, a second adjustment unit 13903, a third adjustment unit 13905, and a fourth adjustment unit 13907 shown in FIG. 16.

The first adjustment unit 13901 is configured to increase the correction ratio in the case where a pose error corresponding to each time in a target time period is determined to be greater than or equal to a pose error corresponding to a target time based on the pose error change rule.

The second adjustment unit 13903 is configured to reduce the correction ratio in the case where the pose error corresponding to each time in the target time period is determined to be less than the pose error corresponding to the target time based on the pose error change rule.

The third adjustment unit 13905 is configured to increase the correction ratio in the case where a changing trend of the pose errors is determined to be an increasing trend based on the pose error change rule.

The fourth adjustment unit 13907 is configured to reduce the correction ratio in the case where the changing trend of the pose errors is determined to be a decreasing trend based on the pose error change rule.

Each of the target time, a starting time of the target time period, and an ending time of the target time period is one of the plurality of times, respectively, the starting time of the target time period being later than the target time, and a duration of the target time period is greater than or equal to a preset duration.

Figure 17:
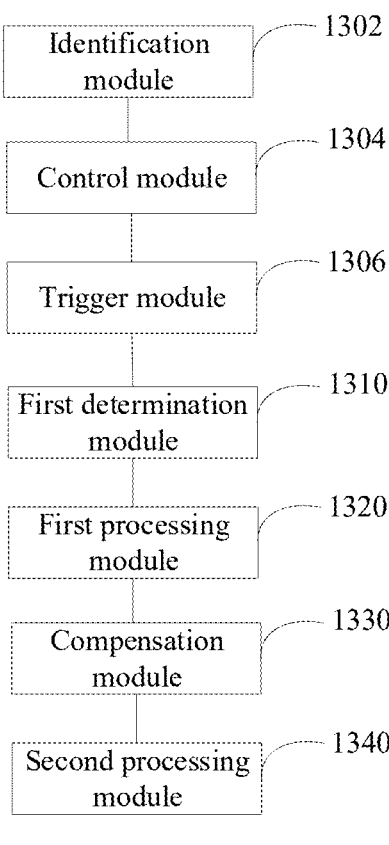
FIG. 17 is a flow diagram of an apparatus for displaying an image on a head-mounted display device provided in still yet another exemplary embodiment of the present disclosure.

In an optional example, as shown in FIG. 17, the apparatus further includes:

an identification module 1302 is configured to identify a type of a platform where the head-mounted display device is located;

a control module 1304 configured to control the head-mounted display device to switch to a target mode in the case where the type is a movable platform; and a trigger module 1306 configured to trigger the first determination module 1310 in the case where the head-mounted display device is in the target mode.

In an optional example, the head-mounted display device is configured to be coupled to a movable platform where the head-mounted display device is located and be movable relative to the movable platform.

In an optional example, one of the following two items is met:

the preset pose is a pose configured such that a display image of the head-mounted display device is displayed at a preset position in a coordinate system of the head-mounted display device; and the preset pose is a pose configured such that the display image of the head-mounted display device is aligned with the direction of gravity.

Figure 18:
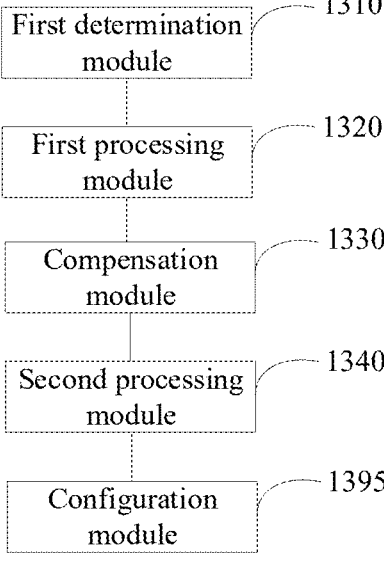
FIG. 18 is a flow diagram of an apparatus for displaying an image on a head-mounted display device provided in a further exemplary embodiment of the present disclosure.

In an optional example, as shown in FIG. 18, the apparatus further includes:

a configuration module 1395 configured to configure an optical engine in the head-mounted display device based on the second corrected pose.

Exemplary Electronic Device

An electronic device according to an embodiment of the present disclosure will be described below with reference to FIG. 19. The electronic device may be either or both of a first device and a second device, or a stand-alone device independent thereof. The stand-alone device may communicate with the first device and the second device to receive collected input signals therefrom.

Figure 19:
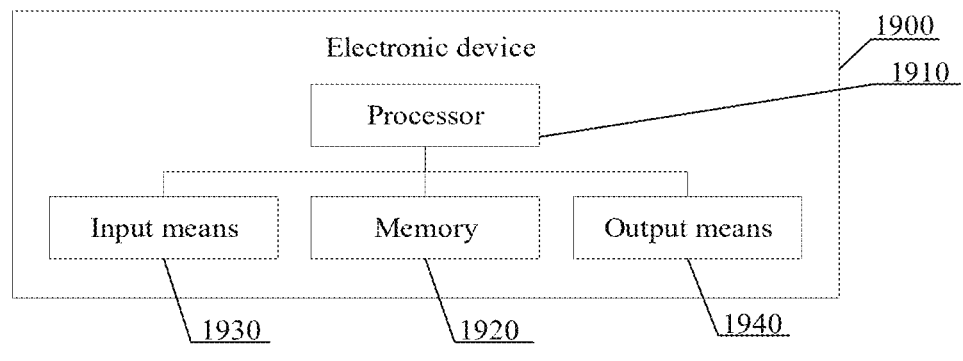
FIG. 19 is a structural diagram of an electronic device provided in an exemplary embodiment of the present disclosure.

FIG. 19 illustrates a block diagram of an electronic device 1900 according to an embodiment of the present disclosure.

As shown in FIG. 19, the electronic device 1900 includes one or more processors 1910 and a memory 1920.

The processor 1910 may be a central processing unit (CPU) or other form of processing unit having data processing capabilities and/or instruction execution capabilities, and may control other components in the electronic device 1900 to perform desired functions.

The memory 1920 may include one or more computer program products. The computer program products may include various forms of computer-readable storage medium, such as a volatile memory and/or a non-volatile memory. The volatile memory may, for example, include random access memory (RAM) and/or a cache memory (cache), etc. The non-volatile memory may, for example, include a read-only memory (ROM), a hard disk, a flash memory, etc. One or more computer program instructions may be stored on the computer-readable storage medium, and the processor 1910 may execute the program instructions to implement the method for displaying an image on a head-mounted display device in the embodiments of the present disclosure described above and/or other desired functions. Various contents such as input signals, signal components, noise components, etc. may also be stored in the computer-readable storage medium.

In an example, the electronic device 1900 may further include input means 1930 and output means 1940. The components are interconnected via a bus system and/or other form of connecting mechanisms (not shown).

For example, in the case where the electronic device 1900 is a first device or a second device, the input means 1930 may be a microphone or a microphone array. In the case where the electronic device 1900 is a stand-alone device, the input means 1930 may be a communication network connector configured to receive collected input signals from the first device and the second device.

In addition, the input means 1930 may also include, for example, a keyboard, a mouse, and the like.

The output means 1940 may output various information to the outside. The output means 1940 may include, for example, a display, a speaker, a printer, and a communications network and remote output means connected thereto, and so on.

Of course, for simplicity, only some of components of the electronic device 1900 relevant to the present disclosure are shown in FIG. 19, while components such as buses, input/output interfaces, and the like are omitted. In addition, depending on a specific application, the electronic device 1900 may also include any other appropriate components.

Exemplary Computer Program Product and Computer-Readable Storage Medium

In addition to the method and device described above, embodiments of the present disclosure may also be a computer program product including computer program instructions. The computer program instructions, when executed by a processor, cause the processor to execute the steps of the method for displaying an image on a head-mounted display device according to various embodiments of the present disclosure as described in the above-described "Exemplary method" section of this specification.

The computer program product may use any combination of one or more programming languages to write program code for performing operations of the embodiments of the present disclosure. The programming languages include an object-oriented programming language such as Java or C++, and also include a conventional procedural programming language, such as "C" language or a similar programming language. The program code may be executed entirely on a user's computing device, partly on a user's device, as an independent software package, partly on a user's computing device and partly on a remote computing device, or entirely on a remote computing device or server.

In addition, embodiments of the present disclosure may also be a computer-readable storage medium configured to store computer program instructions therein. The computer program instructions, when executed by a processor, cause the processor to execute the steps of the method for displaying an image on a head-mounted display device according to various embodiments of the present disclosure as described in the above-described "Exemplary method" section of this specification.

The computer-readable storage medium may be any combination of one or more readable media. The readable medium may be a readable signal medium or a readable storage medium. The readable storage medium may include, for example, but is not limited to, an electronic, magnetic, optical, electromagnetic, infrared, or semiconductor system, apparatus or device, or any combination thereof. More specific examples (a non-exhaustive list) of the readable storage medium include: an electrical connection with one or more conducting wires, a portable disk, a hard disk, a random access memory (RAM), a read only memory (ROM), an erasable programmable read only memory (EPROM or flash memory), an optical fiber, a portable compact disk read only memory ((CD-ROM), an optical storage device, a magnetic storage device, or any suitable combination thereof.

Basic principles of the present disclosure are described above in conjunction with specific embodiments. It is to be noted that the advantages, strengths, effects, and the like mentioned in the present disclosure are only examples and not limitations, and these advantages, strengths, effects, and the like should not be regarded as indispensable for the embodiments of the present disclosure. The specific details in the above disclosure are only for the purpose of exemplification and ease of understanding, and are not limiting. The above details do not constrain the present disclosure to be necessarily implemented with the above specific details.

The embodiments in the specification are described in a progressive manner. Each embodiment focuses on differences from other embodiments. For the same and similar parts between the embodiments, reference can be made to each other. A system embodiment, which substantially corresponds to a method embodiment, is described relatively simply, and for its relevant parts, reference may be made to parts of description of the method embodiment.

Block diagrams of devices, apparatuses, equipment, and systems involved in the present disclosure are only used as illustrative examples and are not intended to require or imply that they are necessarily connected, arranged, or configured in the manner illustrated in the block diagrams. As will be recognized by those skilled in the art, these devices, apparatuses, equipment, and systems may be connected, arranged, or configured in any manner. Words such as "include", "comprise", "have", etc. are open-ended terms, mean "include but not limited to" and may be used interchangeably. The words "or" and "and" as used herein refer to the words "and/or", and may be used interchangeably therewith unless the context clearly indicates otherwise. The word "such as" as used herein refers to the phrase "such as, but not limited to", and may be used interchangeably therewith.

The method and apparatus of the present disclosure may be implemented in many ways. For example, the method and apparatus of the present disclosure may be implemented by software, hardware, firmware, or any combination of software, hardware, and firmware. The above order for the steps of the described method is only for an illustrative purpose, and the steps of the methods of the present disclosure are not limited to the order specifically described above, unless otherwise specified. Additionally, in some embodiments, the present disclosure may also be implemented as programs recorded in a recording medium. The programs include machine-readable instructions for implementing the method according to the present disclosure. Thus, the present disclosure also covers a recording medium that stores programs for performing the method according to the present disclosure.

It is also to be noted that in the apparatus, device, and method of the present disclosure, the components or steps are decomposable and/or recombinable. These decompositions and/or recombinations should be considered as equivalents of the present disclosure.

The above description of the disclosed aspects is provided to enable any person skilled in the art to carry out or use the present disclosure. Various modifications to these aspects are very apparent to those skilled in the art, and general principles defined herein may be applied to other aspects without departing from the scope of the present disclosure. Accordingly, the present disclosure is not intended to be limited to the aspects illustrated herein, but rather in accordance with the broadest scope consistent with the principles and novel features disclosed herein.

The above description has been made for purposes of illustration and description. In addition, this description is not intended to limit the embodiments of the present disclosure to the forms disclosed herein. Although a plurality of example aspects and embodiments have been discussed above, certain variations, modifications, changes, additions, and sub-combinations thereof would occur to those skilled in the art.

What is claimed is:

1. A method for displaying an image on a head-mounted display device, comprising:

determining a reference pose for processing a to-be-display image at a current time, based on angular velocity data of the head-mounted display device at the current time and a first corrected pose for image processing of the head-mounted display device at a previous time;

processing a pose error between the reference pose and a preset pose for image processing, to obtain a corrected pose difference;

compensating the reference pose by using the corrected pose difference to obtain a second corrected pose for processing the to-be-display image at the current time; and rendering the to-be-display image of the head-mounted display device based on the second corrected pose, to display the to-be-display image of the head-mounted display device.

2. The method according to claim 1, wherein processing the pose error between the reference pose and the preset pose for image processing to obtain the corrected pose difference comprises:

correcting a current pose error corresponding to the current time by using a correction ratio to obtain the corrected pose difference, wherein the correction ratio is greater than 0 and less than 1.

3. The method according to claim 2, further comprising:

determining the correction ratio based on compensation reference information, the compensation reference information comprising at least one of: the current pose error corresponding to the current time, an accumulated value of pose errors, an environmental condition of a movable platform where the head-mounted display device is located, and steering information of the movable platform.

4. The method according to claim 3, wherein at least one of:

the correction ratio is positively correlated with the current pose error corresponding to the current time;

the correction ratio is positively correlated with the accumulated value of pose errors;

the environmental condition comprises road surface roughness, and the correction ratio is positively correlated with the road surface roughness; and the steering information comprises a steering degree, and the correction ratio is positively correlated with the steering degree.

5. The method according to claim 2, further comprising:

determining a pose error change rule based on a pose error sequence, the pose error sequence comprising pose errors corresponding to a plurality of times respectively; and adjusting the correction ratio based on the pose error change rule.

6. The method according to claim 5, wherein adjusting the correction ratio based on the pose error change rule comprises at least one of:

increasing the correction ratio in the case where a pose error corresponding to each time in a target time period is determined to be greater than or equal to a pose error corresponding to a target time based on the pose error change rule;

reducing the correction ratio in the case where the pose error corresponding to each time in the target time period is determined to be less than the pose error corresponding to the target time based on the pose error change rule;

increasing the correction ratio in the case where a changing trend of the pose errors is determined to be an increasing trend based on the pose error change rule; and reducing the correction ratio in the case where the changing trend of the pose errors is determined to be a decreasing trend based on the pose error change rule, wherein each of the target time, a starting time of the target time period, and an ending time of the target time period is one of the plurality of times, respectively, the starting time of the target time period being later than the target time, and a duration of the target time period is greater than or equal to a preset duration.

7. The method according to claim 2, further comprising:

receiving a user input operation; and adjusting the correction ratio in response to the user input operation.

8. The method according to claim 1, wherein processing the pose error between the reference pose and the preset pose for image processing to obtain the corrected pose difference comprises:

performing low pass filtering on a current pose error corresponding to the current time to obtain the corrected pose difference.

9. The method according to claim 8, wherein the performing low pass filtering on the current pose error corresponding to the current time comprises:

performing low pass filtering on the current pose error corresponding to the current time by a low pass filter; and the method further comprises:

receiving a user input operation; and adjusting a cutoff frequency of the low pass filter in response to the user input operation.

10. The method according to claim 1, further comprising:

in response to a user selection, switching an image displaying mode of the head-mounted display device to one of a 0 degree-of-freedom mode, a target mode, and a 3 degree-of-freedom mode; and performing the step of determining the reference pose for processing the to-be-display image at the current time, based on the angular velocity data of the head-mounted display device at the current time, and the first corrected pose for image processing of the head-mounted display device at the previous time, in the case where the head-mounted display device is in the target mode.

11. The method according to claim 1, further comprising:

identifying a type of a platform where the head-mounted display device is located;

controlling the head-mounted display device to switch to a target mode in the case where the type of the platform is a movable platform; and performing the step of determining the reference pose for processing the to-be-display image at the current time, based on the angular velocity data of the head-mounted display device at the current time, and the first corrected pose for image processing of the head-mounted display device at the previous time, in the case where the head-mounted display device is in the target mode.

12. The method according to claim 1, wherein the head-mounted display device is configured to be coupled to a movable platform where the head-mounted display device is located and be movable relative to the movable platform.

13. The method according to claim 1, wherein at least one of:

the preset pose is a pose configured such that an image is displayed at a preset position in a coordinate system of the head-mounted display device; and the preset pose is a pose configured such that the image is aligned with the direction of gravity.

14. An electronic device, comprising:

a memory configured to store a computer program product; and a processor configured to execute the computer program product stored in the memory, wherein the computer program product, when executed, causes the processor to perform operations comprising:

acquiring angular velocity data of a head-mounted display device;

determining a reference pose for processing a to-be-display image, based on the angular velocity data and a previous first corrected pose for image processing of the head-mounted display device;

processing the reference pose to obtain a corrected pose difference;

compensating the reference pose by using the corrected pose difference to obtain a second corrected pose for processing the to-be-display image; and rendering the to-be-display image of the head-mounted display device based on the second corrected pose, to display the to-be-display image of the head-mounted display device.

15. A method for displaying an image on a head-mounted display device, the method comprising:

acquiring angular velocity data of the head-mounted display device;

determining a reference pose for processing a to-be-display image, based on the angular velocity data and a previous first corrected pose for image processing of the head-mounted display device;

processing a pose error between the reference pose and a preset pose for image processing to obtain a corrected pose difference;

compensating the reference pose by using the corrected pose difference to obtain a second corrected pose for processing the to-be-display image; and rendering the to-be-display image of the head-mounted display device based on the second corrected pose, to display the to-be-display image of the head-mounted display device.

16. The method according to claim 15, further comprising:

in response to a user selection, switching an image displaying mode of the head-mounted display device to one of a 0 degree-of-freedom mode, a target mode, and a 3 degree-of-freedom mode; and implementing the method according to claim 15.

17. The method according to claim 15, wherein processing the pose error between the reference pose and the preset pose for image processing to obtain the corrected pose difference comprises:

correcting a current pose error corresponding to the current time by using a correction ratio to obtain the corrected pose difference, wherein the correction ratio is greater than 0 and less than 1.

18. The method according to claim 17, further comprising:

receiving a user input operation; and adjusting the correction ratio in response to the user input operation.

19. The method according to claim 17, further comprising:

determining the correction ratio based on compensation reference information, after correction of the pose error is performed using the correction ratio.

* * * * *